US006813368B1

(12) United States Patent
Khanna et al.

(10) Patent No.: US 6,813,368 B1
(45) Date of Patent: Nov. 2, 2004

(54) METHODS AND APPARATUS FOR WATERMARKING MAPS AND OTHER STRUCTURED DATA

(75) Inventors: Sanjeev Khanna, Philadelphia, PA (US); Francis Xavier Zane, Jr., New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 612 days.

(21) Appl. No.: 09/707,694

(22) Filed: Nov. 7, 2000

Related U.S. Application Data
(60) Provisional application No. 60/170,875, filed on Dec. 15, 1999.

(51) Int. Cl.[7] .............................. G06K 9/00; H04L 9/00
(52) U.S. Cl. ...................................... 382/100; 713/176
(58) Field of Search ...................... 382/100; 713/176; 348/589; 345/636; 283/113

(56) References Cited

U.S. PATENT DOCUMENTS

| 5,721,788 A | * | 2/1998 | Powell et al. ............... 382/100 |
| 5,742,892 A | * | 4/1998 | Chaddha ..................... 725/146 |
| 5,825,892 A | * | 10/1998 | Braudaway et al. .......... 380/51 |
| 6,301,368 B1 | * | 10/2001 | Bolle et al. ................. 382/100 |

OTHER PUBLICATIONS

Pieprzyk, "Fingerptints for Copyright Software Protection," 1999, ISW'99, LNCS 1729, pp. 178–190.*
Tomboulian, "Overview and Extensions of a System for Routing Directed Graphs on SIMD Architectures" 1988, IEEE, pp. 63–67.*
Ohbuchi et al., "Watermarking Three–Dimensional Polygonal Models Through Geometric and Topological Modification," IEEE, 1999, pp. 551–560.*
Su et al., "Blind digital watermarking for cartoon and map images," Proc. SPIE vol. 3657: Security and Watermarking of Multimedia Contents, Jan. 25–27, 1999, pp. 296–306.*
Ohbuchi et al., "Watermarking Three–Dimensional Polygonal Models," Proc. 5th ACM International Conference Multimedia, Nov. 9–13, 1997, pp. 261–272.*
Yeo et al., "Watermarking 3D Objects for Verification," IEEE, Jan./Feb. 1999, pp. 36–45.*
Benedens, "Geometry–Based Watermarking of 3D Models," IEEE, Jan./Feb. 1999, pp. 46–55.*
Joe Kilian, F. Thomson Leighton, Lesley R. Matheson, Talal G. Shamoon, Robert E. Tarjan, Francis Zane, "Resistance of Digital Watermarks to Collusive Attacks", Princeton Computer Science Technical Report TR–585–98, 1998, pp. 1.
Emil Praun, Hugues Hoppe and Adam Finkelstein, "Robust Mesh Watermarking", Princeton Computer Science Technical Report TR–593–99, 1999, pp. 1–21.

(List continued on next page.)

Primary Examiner—Daniel Mariam
Assistant Examiner—Shefali Patel

(57) ABSTRACT

Techniques for watermarking structured data, such as map data are addressed. These techniques advantageously allow the detection of an unauthorized copy of the original data and to track the source of the unauthorized copy based upon a variety of opportunities to access the unauthorized copy. For example, in an Internet context, an unauthorized copy of a map may be provided to online customers so that they can make queries such as the distance between two driving destinations. Having such access, copies can be detected and traced to the original purchaser of the map.

34 Claims, 5 Drawing Sheets

OTHER PUBLICATIONS

Joe Kilian, F. Thomson Leighton, Lesley R. Matheson, Talal G. Shamoon, Robert E. Tarjan and Francis Zane, "Resistance of Digital Watermarks to Collusive Attacks", ISIT 1998, Cambridge MA, USA, Aug. 16–Aug. 21.

Ingemar J. Cox, Joe Kilian, F. Thomson Leighton and Talal Shamoon, "Secure Spread Spectrum Watermarking for Multimedia", IEEE Transactions on Image Processing, vol. 6, No. 12, pp. 1673–1687, Dec. 1997.

Dan Boneh and James Shaw, "Collusion–Secure Fingerprinting for Digital Data", IEEE Transactions on Information Theory, vol. 44, No. 5, pp. 1897–1905, Sep. 1998.

Andrew B. Kahng, Stefanus Mantik, Igor L. Markov, Miodrag Potkonjak, Paul Tucker, Huijuan Wang and Gregory Wolfe, "Robust IP Watermarking Methodologies for Physical Design", In Proceedings of the 35$^{th}$ Design Automation Conference Proceedings, pp. 782–787, San Francisco, CA, Jun. 1998.

Neal R. Wagner, "Fingerprinting", In Procedings of the 1983 IEEE Symposium on Security and Privacy, pp. 18–22, Apr. 1993.

A.B. Kahng, J. Lach, W.H. Mangione–Smith, S. Mantik, I.L. Markov, M. Potkonjak, P. Tucker, H. Wang and G. Wolfe, "Watermarking Techniques for Intellectual Property Protection", In Proceedings of the 35$^{th}$ Annual Design Automation Conference, pp. 776–781, San Francisco, CA, Jun. 1998.

Gang Qu and Miodrag Potkonjak, "Analysis of Watermarking Techniques for Graph Coloring Problem", International Conference on Computer Aided Design, San Jose, California, ACM 1998, pp. 190–193.

Arlindo L. Oliveira, "Robust Techniques for Watermarking Sequential Circuit Designs", In Proceedings of the 36$^{th}$ Annual Design Automation Conference, pp. 837–842, New Orleans, LA, Jun. 1999.

\* cited by examiner

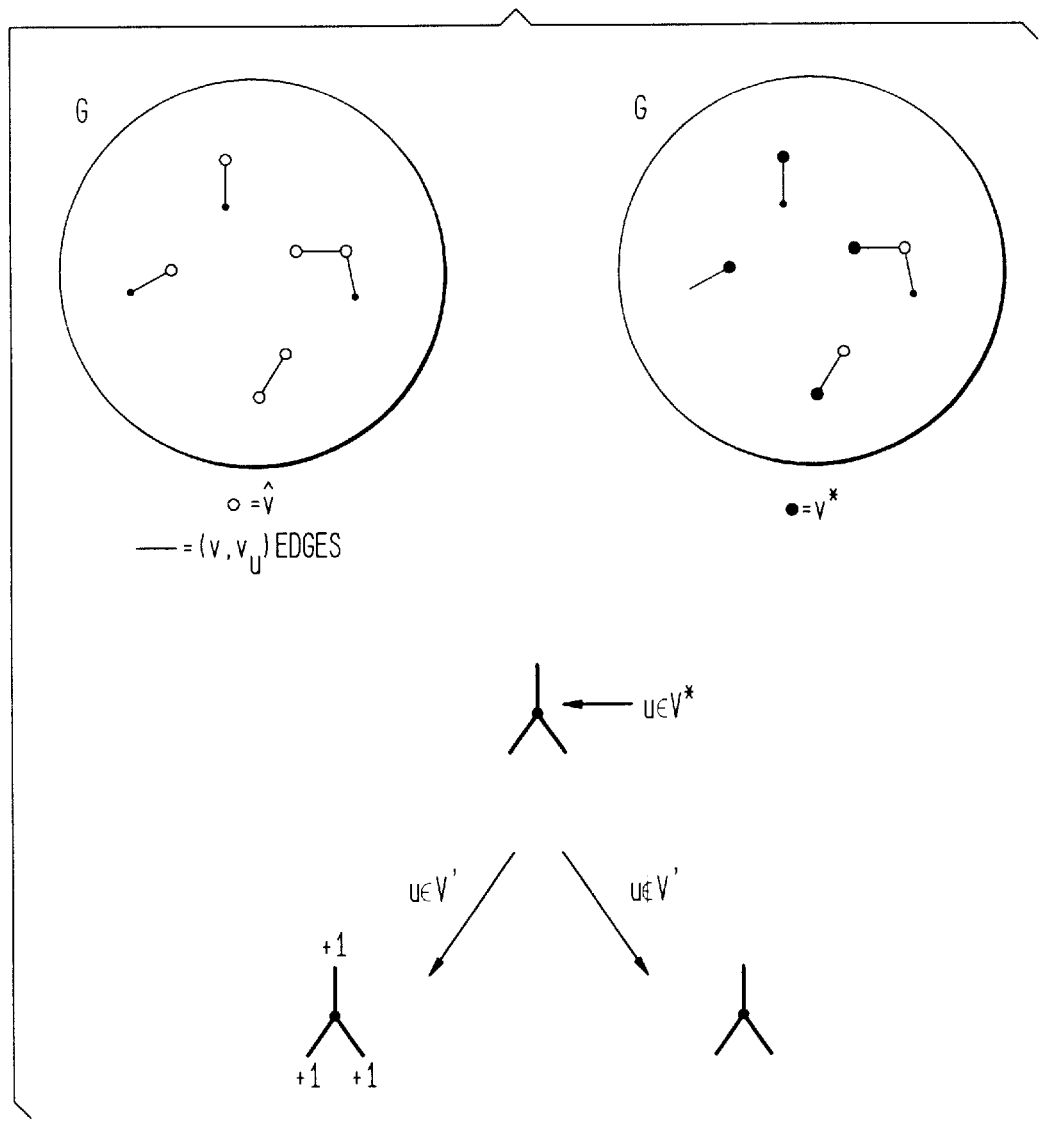

METHODS AND APPARATUS FOR WATERMARKING MAPS AND OTHER STRUCTURED DATA

This application claims the benefit of U.S. Provisional Application Ser. No. 60/170,875 filed Dec. 15, 1999 which is incorporated by reference in its entirety herein.

FIELD OF THE INVENTION

The present invention relates generally to improved methods and apparatus for protecting digital information from copying, and more particularly to electronic techniques for watermarking maps and other structured data.

BACKGROUND OF THE INVENTION

With the widespread availability of digital information and the ease of copying such information, the problem of protecting that information from illicit copying has gained new prominence. A widely used method for addressing this problem is watermarking. This technique is also called fingerprinting and involves embedding hidden information into the data which encodes ownership and copyright information. Data suspected of being pirated can then be tested for this hidden information, determining if the data is copyrighted. Furthermore, by embedding unique hidden information into each copy, pirated data can be traced back to its original purchaser.

This approach has been applied to a wide range of media, such as images, audio, video, and the like. More recently, intellectual property protection problems related to VLSI design, such as placement and routing design data and implementations of finite state machines, have also been addressed in this fashion. In addition, there are cryptographic protocols which address related issues, such as how to distribute copies with guarantees of anonymity and reliable authentication.

SUMMARY OF THE INVENTION

The present invention addresses the application of watermarking techniques to protect map and other structured data. Consider the following situation, by way of example. Through expensive surveys, a company, referred to as the owner of the map, compiles accurate map data, represented by a weighted graph where nodes represent locations, edges represent links between locations, and the weights represent the distance between adjacent locations. This data is then sold to other parties called providers who provide end users access to it. This access is generally indirect in the sense that the provider allows the end users to query pairs of nodes, such as a starting point like New York City and an ending point like Chicago. The provider then responds to each query with appropriate information related to the pair, such as the distance between the nodes, or a shortest route, or both. This situation already exists for maps of the US roadway system, with companies such as MapQuest acting as map owners, web sites like Yahoo! acting as providers, and end users across the Internet accessing the data. In such a context, protecting the underlying data presents a variety of problems. For example, a watermark cannot distort the underlying data in a way that eliminates the value of the map, or which is easily detectable and countered. In addition, it is not hard to envision similar situations or data structures for which these problems could arise, such as providing routing information on a network.

A more complete understanding of the present invention, as well as further features and advantages of the invention, will be apparent from the following Detailed Description and the accompanying drawings.

BRIEF DESCRIPTION OF THE DRAWINGS

FIGS. 2, 3 and 4A illustrate aspects of marking approaches utilizing a nonadversarial additive distance model in accordance with the present invention;

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art. While the present invention is disclosed in terms of a marking approach for maps, the present invention is not so limited and may be advantageously employed with other data structures, such as routing data for an integrated circuit layout, for example.

Figure 1:
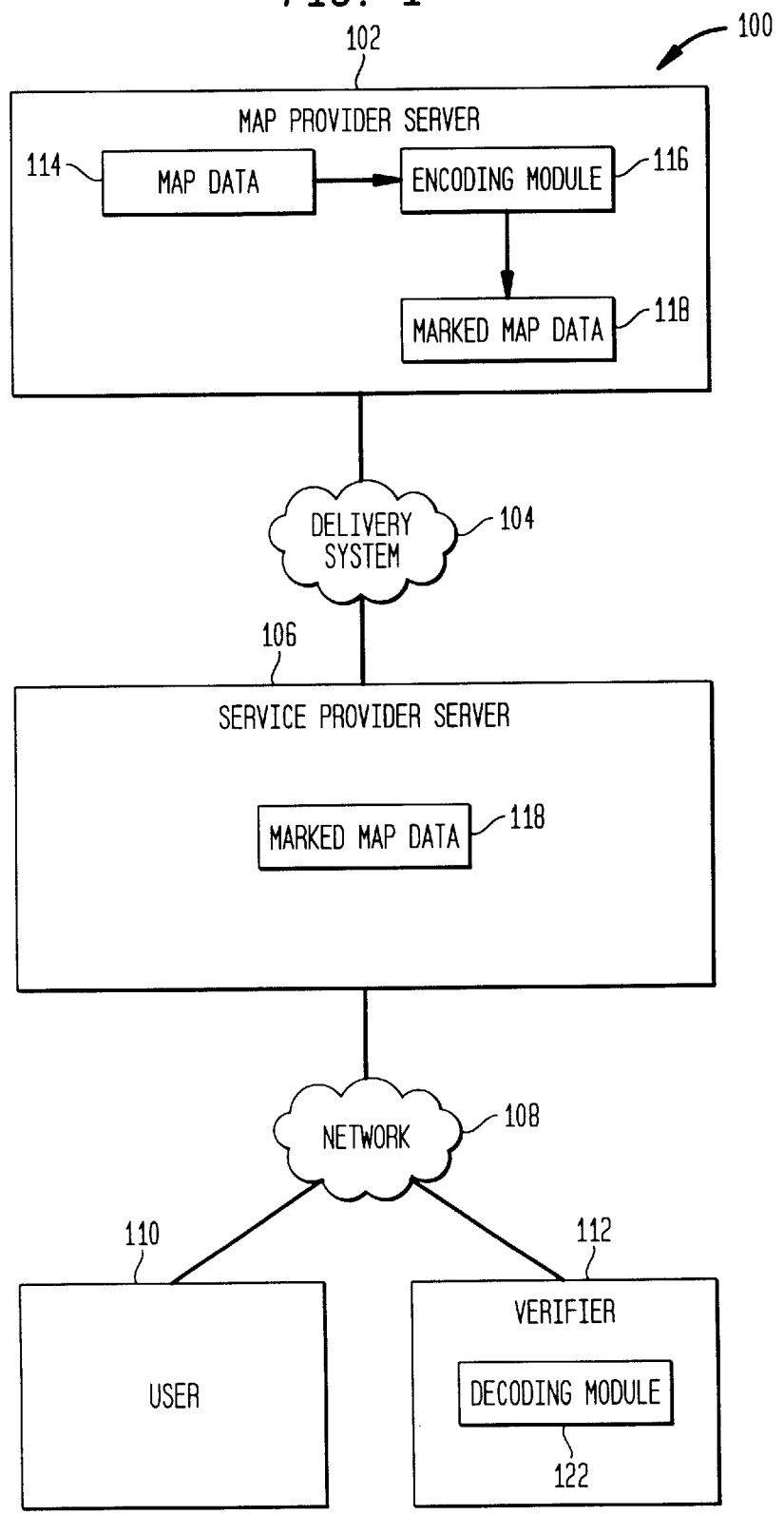
FIG. 1 illustrates a system for watermarking maps and other structured data in accordance with the present invention.

FIG. 1 illustrates a suitable system 100 for watermarking map or other structured data in accordance with the present invention. The system 100 includes a map provider server 102 having memory 114 for storing a database of map data collected and owned by the map provider. System 100 also includes an encoding module 116 which may be implemented as a processor controlled by software to receive original unencoded map data, to encode it, and to produce as an output marked map data 118. The server 102 is connected through a delivery system 104 to a service provider server 106. The delivery system 104 may include a communications network such as the Internet, physical delivery of a CD ROM, or other suitable delivery systems.

Typically, a service provider will purchase map data and then make that data available to customers, such for as user 110. The user will connect to service provider server 106 utilizing a personal computer or other network connection device through a network 108, such as the Internet and ask for driving directions, travel time or distance, or a portion of the marked map data applicable to the user's intended query, for example during directions from his or her home to a vacation hotel. The service provider server 106 downloads the requested data to the user 110. Alternatively, the map data 118 may be made available to the user 110 through physical delivery of a CD ROM, or other suitable delivery systems.

While the original map data 114 may have been gathered and collected at great expense, it may be relatively easily and cheaply copied. The marking of the present invention allows detection of unauthorized copies and allows those copies to be traced. To this end, system 100 includes a verifier 112 including a decoding module 122 for detecting an unauthorized copy as addressed in greater detail below.

In one aspect, the present invention provides watermarking or marking approaches which allow the owner to distribute and identify many different copies of an original graph or data structure G, with associated edge lengths l(e), in order to protect the data. Each time the owner sells a copy of the map to a provider, he distributes a copy with a unique set of modifications, referred to as a marked copy, which consists of the original graph G with new edge lengths l'(e). Modifications to the structure of the graph are not allowed, since the resulting marked copies are clearly incorrect. At the same time, changes in length which are very small, such as 0.0001 mile, compared to a natural unit of length, such as 1 mile or 0.1 mile for driving directions, are not employed since such changes can be easily undone, even unintentionally, by simply rounding the data.

Each marked copy should involve only a slight distortion with respect to the overall map G and length l, as measured in terms of the maximum error in inter-point distances, since badly-distorted data is not acceptable to the providers or the end users. When confronted with a provider suspected of using the data illegally, the owner desirably should be able to accurately determine the unique provider from whom that copy must have originated using only publicly accessible information. That is, the map owner accesses the data from the provider just as an end user would makes queries, and analyzes the responses.

A number of different approaches are discussed herein with the best approach depending on what distortion is allowed, what information is returned in response to a query, and to what extent an adversary may further distort the data to evade detection. One goal throughout is to maximize the number of copies the owner can distribute subject to these constraints, and an important issue is that these constraints typically put limits on the number of distinct, distinguishable marked copies.

The requirements that marked copies must have small distortion and that copies must be distinguishable via queries, present new problems quite different from those studied previously and addressed by the prior art. While the problem of modifying the original data while introducing small distortion has been studied extensively in the case of media watermarking, the use of a concrete distortion measure like interpoint distance error makes it nontrivial even to identify large sets of small-distortion changes. For example, small local changes, if not made carefully, may accumulate into a large distortion over the whole graph. By contrast, for media documents, such as images, the relevant distortion measure is based on human perception, and can only be quantified in an ad hoc way.

A second goal is a new one, largely because the problem does not exist in the well-studied media watermarking case. If the owner encounters a suspect copy of an image, then he has complete access to the image data for this copy, which he can then use to determine the guilty party. In many situations which are presently addressed, the owner must distinguish the copies on the basis of queries alone. This issue seems likely to appear in other settings: one might like to determine how a chip was designed or produced given access to the chip but not the proprietary design data, for example.

The present focus is mainly on a single copy attack, in other words, detecting providers who have access only to a single marked copy. Previous theoretical work on watermarking has largely centered on providing resistance to collusive attacks, which compare several differently marked copies in an attempt to defeat the approach. Such attacks are of course more general. However, most models previously used to study watermarking problems focus only on collusive attacks. In the setting where the number of providers is not too large, collusion is only of secondary importance.

We turn to the watermarking problem for maps and describe various models in detail. In this discussion, a model is characterized by three parameters:

How is distortion measured?

What type of information does the provider give in response to queries?

Is the provider free to answer as he chooses in order to evade detection?

In the following discussion these parameters are addressed in detail starting with the notation.

Notation

The input data is always assumed to be represented as a connected graph $G=(V,E)$ with a length function $l:E \rightarrow Z$. For a node $u \in V$, $N(u)$ denotes its neighbors in G. For any pair of nodes u, $v \in V$, $d_G(u, v)$ denotes the shortest distance between u and v, as determined by the metric induced by l. $P(G)$ denotes any collection of $\binom{n}{2}$ paths $P_1, P_2, \ldots$, such that there is a shortest path for each pair of nodes. Given a graph $G=(V, E)$ with length function l, a marked copy of G is another graph $G'(V, E)$ with length function l'. In this discussion, the values $l(e)$ and $l'(e)$ are integral, so all modifications to e change its length by at least 1. Finally, m and n are used to denote the number of edges and nodes, respectively, in the input graph. As would be understood by one skilled in the art, an integral value denotes the unit of measurement used for the data and does not necessarily denote an integer. For example, an integral value may be 10 kilometers, 0.1 miles or 0.0001 miles, depending on the accuracy of the data.

Measures of Distortion

When creating a marked copy of an input graph G, the present marking approach modifies the length function both to make a copy detectable and to encode the identity of a provider. Since it is desirable to ensure that the quality of information provided by a marked copy is close to that of the original, these modifications are made in a manner so that they do not introduce a large distortion in the marked copy G'. There are two natural measures of distortion, additive and multiplicative. Generally, additive distortion requires that distances be preserved within a fixed distance, such as 1 mile, for example, and multiplicative distortion requires that distances be preserved within a percentage, such as 10%, for example. More specifically, G' has an additive distortion of d if $\max_{u,v}|d_{G'}(u, v)-d_G(u, v)| \leq d$. G' has a multiplicative distortion of d if $\max_{u,v}|d_{G'}(u, v)-d_{G'}(u, v)| \leq d \cdot d_G(u, v)+\beta$ for some constant $\beta$.

With respect to a graph G, additive and multiplicative distortion can also be defined for a path P. If $P=\{e_1, \ldots, e_k\}$ is a path between u, $v \in V$, then P has an additive distortion of d if $$\sum_i l(e_i) - d_G(u, v) \leq d,$$

and a multiplicative distortion of d if $$\sum_i l(e_i) - d_G(u, v) \le d \cdot d_G(u, v) + \beta$$

for some constant β.

When the context (additive or multiplicative) is clear, G' has a d-distortion of G if it has distortion d with respect to G. This patent focuses on modified graphs G' which are d-distortions of the original graph G, for small constant values of d.

Queries and Responses

One advantage provided by the present invention is to address the limitations placed on watermarking approaches where the data originator has only indirect access to the data used by a suspect provider. In this setting, this indirect access will typically be through the interface the provider offers to end users, returning some information A(u, v) in response to a query (u, v). Three different models, based on the nature of the information available via the provider's interface to the end-users are addressed:

Edge Queries: If (u, v)∈E, A(u, v)=l((u, v)).
Distance Queries: A(u, v)=$d_G$(u, v).
Route Queries: A(u, v)=P, where P is a shortest path from u to v in G (no distance information is assumed to be revealed).

Broadly speaking, the edge model gives the owner complete access to the copy of the provider. While often unrealistic, it allows the separation of the limitations imposed by the small distortion requirement from the ones imposed by the indirect access, and allows a focus on only the problems posed by the small distortion requirement.

Since many existing Internet map engines give both distance and route information, the ability to encode information in the more restrictive distance model has relevance to real-world situations. In examining it, the present invention builds on the techniques described below for the simpler edge model.

The route model provides the end-user, and thus the owner, with only a path connecting the query nodes, rather than distance information. Such a strategy might be employed by a cheating provider, since it allows him to give useful information (how to get from point A to point B) while suppressing additional information that may help the owner catch him. More importantly, the route model applies naturally to situations in which the provider, rather than actively providing answers to queries, instead responds by taking some action that may be observed by the owner. As an example, consider the case where the provider is a trucking company which uses maps to find shortest routes for its trucks, and the owner wishes to determine whether the trucking company makes use of his data simply by observing the routes taken by the trucks.

Adversarial vs. Nonadversarial

The next point which is considered is whether or not the provider gives honest answers consistent with his data in response to queries. A provider using an illegally obtained copy may consider introducing additional distortion in answering queries to evade detection.

A model is non-adversarial if the provider answers all queries correctly, based on the copy of the map he possess, and adversarial otherwise.

Clearly, in an adversarial setting, one needs to limit or make assumptions about the behavior and resources of the provider. Otherwise, he can always evade detection. Specifically, against an adversary who either provides answers with large distortion or has fairly accurate knowledge of the true map, no approach can be effective. However, such pirates either produce worthless copies or knew the details of the map before acquiring a copy. Thus, defeating such pirates is not as important. These two cases are ruled out by formalizing two assumptions, namely, the Bounded Distortion Assumption and the Limited Knowledge Assumption addressed further below.

Marking Approach

A marking approach consists of a pair of processes, M and D, where M is called the marking process and D is called the detection process (also referred to as a detector). A marking approach is said to encode b bits of information with an additive (multiplicative) distortion d if the following conditions are satisfied:

1. M takes as input G=<G,l> and a string r∈$\{0, 1\}^b$, and outputs $G_r$=<G,$l_r$> such that for any r∈$\{0, 1\}^b$, $G_r$ is a d-distortion of G.

2. D takes as input <G,l> and answers A=$U_{u,v \in V}$A(u, v) to every pairwise query, as provided through the end-user interface, and outputs r∈$\{0,1\}^b$.

In other words, the marking process maps each provider r to a copy of the map $G_r$=<G,$l_r$> such that $G_r$ is a d-distortion of G, and the detection process uses the answers to its queries to recover the provider r who possesses this copy. If the marking process encodes b bits, then $2^b$ distinguishable copies can be distributed.

A marking approach has an error p if for any provider using $G_r$, Pr[D outputs r]≥1−p. In the case of the adversarial models, it will be necessary to consider approaches with nonzero error.

It is easy to see that if only bounded distortion is allowed, one cannot hope to encode more than O(m) bits of information. The present invention advantageously encodes a number of bits polynomial in n or m.

Nonadversarial Edge and Distance Models

We start with a study of the edge and the distance models in the nonadversarial setting. The models here serve to highlight the manner in which shortest paths in a graph may change when the edge lengths are modified and reveal some inherent difficulties in watermarking maps. A main result is as follows:

For the nonadversarial edge model, there are marking approaches that encode $\Omega(m^{1/2-\epsilon})$ bits with additive distortion and $\overline{\Omega}(m)$ bits with multiplicative distortion. For the nonadversarial distance model, there are marking approaches that encode $\Omega(n^{1/2-\epsilon})$ bits with additive distortion and $\overline{\Omega}(n)$ bits with multiplicative distortion. All additive distortions here are O(1/ϵ) while the multiplicative distortions are (1+o(1)).

As would be recognized by one skilled in the art, ϵ denotes a small constant greater than zero. For a function f(n)=Ω(g(n)), Ω indicates that the growth rate of f(n) is at least that of g(n). More specifically, Ω indicates that there exists some constant c>0 such that for all sufficiently large n, f(n)>=c*g(n). For a function f(n)=o(g(n)), o indicates that the growth rate of g(n) is strictly smaller than that of f(n). More specifically, o indicates that for all constants c>0, for a sufficiently large n, f(n)<c*g(n). Similarly, for f(n)=O(g(n)), O indicates that the growth rate of f(n) is at most that of g(n).

Adversarial Edge and Distance Models

Building on the techniques for the nonadversarial setting above, a marking approach is designed that works in a general adversarial model by modifying the marking approach to make it more robust against pirates. This approach introduces only a small additive distortion d and is effective against an adversary willing to introduce a much larger additive distortion d' in its effort to evade detection.

For the adversarial edge model, there is a marking approach that encodes $\Omega(m^{1/2-\epsilon})$ bits while for the adversarial distance model, there is a marking approach that encodes $\Omega(n^{1/2-\epsilon})$ bits.

Nonadversarial Route Models

Finally, the patent addresses marking approaches for the route model. When the queries are answered only with route information, the marking problem becomes significantly more complex. In particular, the topology of the graph as well as its length function plays a critical role. To encode information in a query (u, v) with only a small distortion, it must be the case that there is at least one alternate path connecting u and v that is not much longer than a shortest path. Thus effective marking approaches require not only that the topology of the underlying graph allow for multiple distinct paths between many pairs of nodes but that the underlying length function allows for multiple near-shortest paths. For instance, there are graphs G such that (i) $\Omega(n)$ bits can be encoded in the route model with multiplicative distortion when all edges have similar lengths, but (ii) only $O(\log n)$ bits can be encoded when the edge lengths are allowed to be arbitrary. In a similar vein, any approach which is allowed an additive distortion of d cannot mark a clique with uniform edge lengths equal to d+1.

In light of such inherent limitations, design of good marking approaches in the route model requires that the input data satisfy certain properties. We begin our analysis on graphs with nearly-uniform edge lengths and multiplicative distortion measure. To ensure the existence of a large number of alternate routing paths, we begin with the assumption that the underlying graph either has an $\Omega(n^\epsilon)$-sized 2-edge connected component or it satisfies $m \geq n+n^\epsilon$. In other words, it contains sufficiently many edges besides what are needed by a spanning tree.

For the nonadversarial route model, there is a marking approach that encodes $\Omega(m^{1/2})$ bits with small multiplicative distortion when (i) the underlying graph has either $\Omega(n^\epsilon)$-sized 2-edge connected component or it has $n+n^\epsilon$ edges, and (ii) its length function is nearly-uniform.

Distance Model with Additive Distortion Measure

Figure 2:
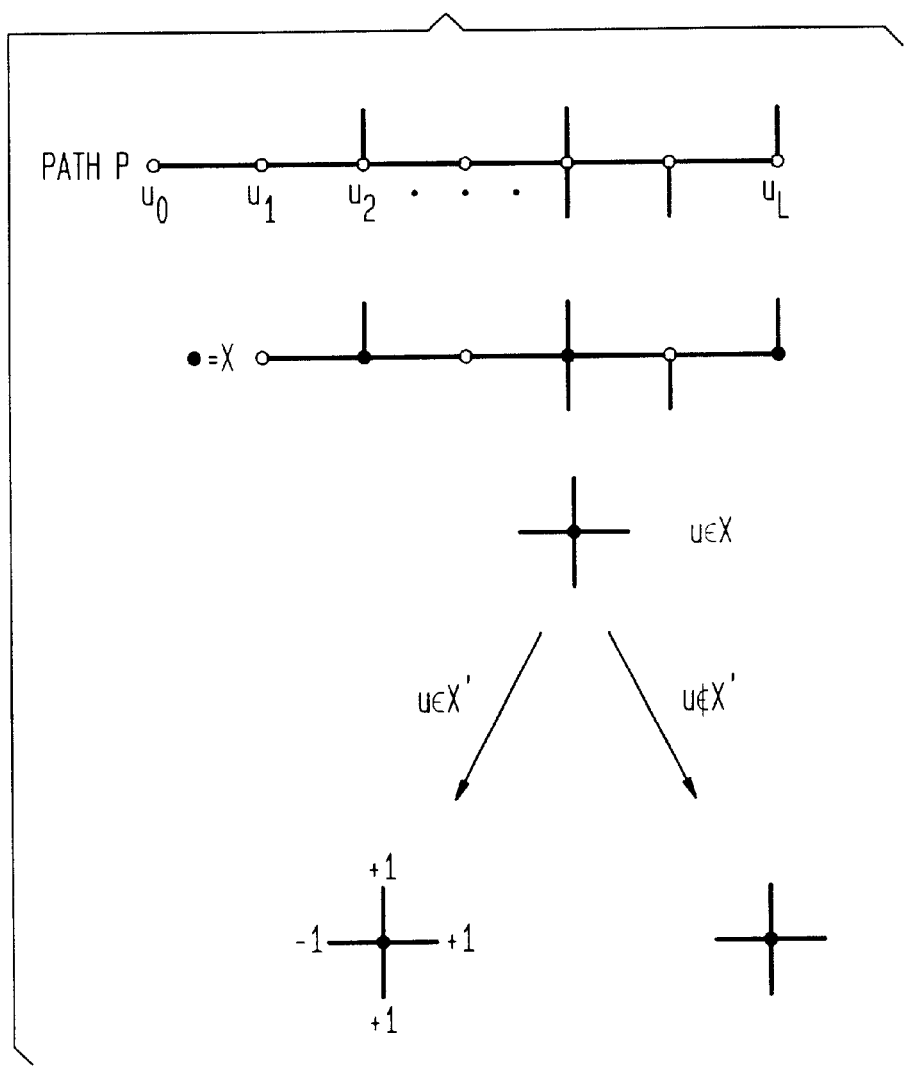

We next address a marking approach that allows us to get $O(n^{1/2-\epsilon})$ bits of information by introducing only an additive distortion of $O(1/\epsilon)$. Let $P \in P(G)$ be a shortest path in G with a largest number of edges on it and let L denote the number of edges on P. This marking approach depends on whether or not L exceeds a certain threshold value $L_0$ (to be determined later). Let $u_0, u_1, \ldots, u_L$ be the nodes along the path P, as shown in FIG. 2.

Figure 3:
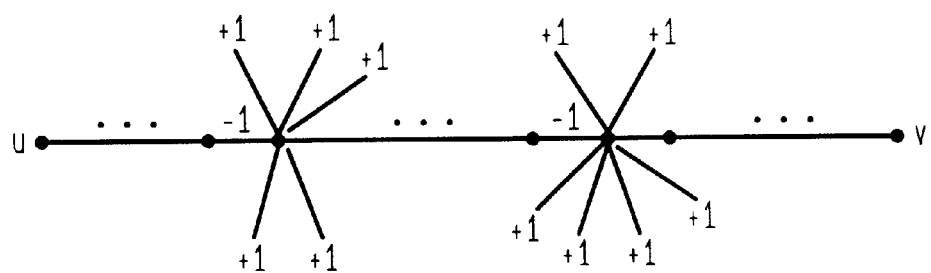

In the case of $L > L_0$, the marking approach focuses on the path P. Let X be the set of nodes $u_i$ such that i is odd. Then, the following procedure is used to create a marked copy for each $X' \subseteq X$. Let $u_{i_j}, \ldots, u_{i_k}$ be the nodes in X'. A marked copy G' is created by modifying the length function l to l' in the following manner. For each $u_{i_j} \in X'$, we set $l'((u_{i_j-1}, u_{i_j})) = l((u_{i_j-1}, u_{i_j}))-1$ and $l'((u_{i_j-1}, v_{i_j})) = l((u_{i_j-1}, v))+1$ for $v \neq u_{i_j}$. As would be understood by one skilled in the art, in the present context, $\epsilon$ indicates that $u_{i_j}$ is an element of set X'. The remaining edge lengths are kept unchanged. An example is shown in FIG. 3 which illustrates a marking approach for the additive distortion measure in the distance model. This approach introduces only a small additive distortions for any pair x, y of nodes, $|d_{G'}(x,y)-d_G(x,y)| \leq 3$.

The detection process is to simply query the distance between the end-points of every edge on P such that one of its end-points lies in X. Consider any edge (u, v) on the path P that its length is decremented by 1. Since (u, v) is on a shortest path in G, $d_G(u, v)=l((u, v))$. If its length is decremented in some copy G', then $d_{G'}(u, v)=l((u, v))-1$. Now using the fact that the marking approach creates a one-to-one correspondence between the marked copies and the subsets of edges on P whose length is decremented, the detection process can always uniquely identify the underlying copy from the answers to its queries. Thus, this approach gives us $|X| \geq L_0/2$ bits.

For $L \leq L_0$, a probabilistic method is employed to design a marking approach. Given a set $V' \subseteq V$, a V'-node marking of the graph G is a graph G' with a length function l' defined as follows: $l((u, v))+1$ if $u \in V'$, and $l((u, v))$ otherwise.

A set V' of nodes is described as an $\epsilon$-good node marking set if the graph G', the V'-node marking of G, satisfies the following property: $|d_{G'}(x,y)-d_G(x,y)| < \lceil 1/\epsilon \rceil$.

The proposition below shows that an $\epsilon$-good node marking set of a large size can be readily constructed. Let $V' \subseteq V$ be obtained by randomly picking each node with probability $p=1/(L_0 n^{2\epsilon})$. Then V' is an $\epsilon$-good node marking set of size $\Omega(pn)$ with probability at least ⅓.

Let V* be an $\epsilon$-good node marking set with $\Omega(n^{1/2-\epsilon})$ bits of information with only an additive distortion of $1/\epsilon$ for any $0 < \epsilon < ½$.

Adversarial Case

This section addresses the more realistic scenarios where the provider is adversarial, and may present a distorted view of his data in an attempt to either evade detection or incriminate other providers. We focus our attention on the additive distortion measure and develop a general framework that transforms our marking approaches for nonadversarial settings to ones that apply to the adversarial case. We will illustrate our framework for distance queries. In the discussion which follows, A(u, v) is defined as denoting the value returned by a provider of a suspect map in response to the query (u, v) where u, $v \in V$.

Model and Assumptions

As observed earlier, any reasonable model must limit the adversary's ability to distort the answers to the queries as well as the extent to which he knows about the true underlying data. These two assumptions are now described in further detail.

The first assumption, an assumption that distortions will be bounded, is supported by the fact that if the adversary's answers are too far from reality, no one will be interested in asking him for information and the adversary's use of the data is not a competitive threat. This assumption may be quantified as for all (u, v)$\in V \times V$, $|A(u, v)-d_G(u, v)| \leq d'$, where d' is an absolute constant.

Bounded Distortion Assumption

In marking the graph, each edge length is altered by at most 1, and distances distorted by at most d. It is important to note that the assumption above does not require the provider's distortion to be bounded by some function of d, allowing him significant freedom to evade detections. By contrast, if we were to restrict the provider in the same fashion as the owner, the problem would be easy: If the owner changes some distances by ±d, and the provider makes any change to that graph, then unless the sign of the provider's change matches the sign of the owner's change every time, the resulting distortion is larger than d. However, in many situations of interest, it is not reasonable to hold the owner and provider to exactly the same standard for distortion.

The second, more subtle, limitation is that the provider has limited knowledge about the graph. From the owner's perspective, the true goal is to catch those providers who would benefit from stealing a copy of the marked graph because their own prior knowledge of the true graph is inadequate. Providers that already have detailed knowledge of the true distances independent of a copy from the owner are not particularly relevant as they can independently derive the maps without copying. We formalize this lack of knowledge as follows. Given a vector $\delta \in Z^E$, we define a length function $l_\delta$ such that $l_\delta(e)=l(e)=\delta(e)$, and let $G_\delta$ denote the graph G with length function $l_\delta$. Now define $\Delta(u, v)=d_{G_\delta}(u, v)-d_G(u, v)$.

$W \subseteq V \times V$ is low-bias with respect to $S \subseteq \{0,+1,-1\}^E$ if for all $(u, v) \in W$, $|\Delta(u, v)| \leq 1$ and $\forall z \in \{0,+1,-1\}$, $$\Pr_{\delta \in S}[\Delta(u, v) = z] \leq 1/2.$$

That is, for every query drawn from W, the change in distance is at most 1 and no single value predominates as S is varied. This constraint allows the definition of sets of queries $(u, v)$ for which $\Delta(u, v)$ is unpredictable even to someone aware of biases in $\delta(e)$ over $\delta \in S$.

$S \subseteq \{0,+1,-1\}^E$ is $(\gamma,p)$-unpredictable if for any $W \subseteq V \times V$, such that W is low-bias with respect to S and $|W|=w(1)$, any strategy $A_{G_\delta}$ available to the adversary satisfies $$\Pr_{\delta \in S}\left[\sum_{(u,v) \in W}[A_{G_\delta}(u, v) = \Delta(u, v)] > \left(\frac{1}{2} + \gamma\right)|W|\right] < p$$

Throughout, whenever we consider a probability involving the success of the strategy A, it is implicitly taken over the random choices made by A.

For any $S \subseteq \{0,+1,-1\}^E$ such that $|S|=w(1)$, S is $(\gamma,p)$-unpredictable.

Because we require this assumption to hold only for large S, we allow the provider to have accurate knowledge of a constant-sized subset of the graph, and instead assume only that he does not have reliable statistical information over the whole graph.

In analyzing our approaches, a natural relationship between the parameters of our assumptions is found. A weak distortion assumption (large d') requires a strong unpredictability assumption (small $_\gamma$), and vice versa. In this discussion d', $_\gamma$, and p refer to the parameters used in the two assumptions.

Framework

A general framework for watermarking graphs in adversarial settings is next addressed. Given a graph, this framework requires that a watermarking approach provides a pair of distinct values $a_1, a_2 \in \{0,+1,-1\}$ a set $S \subseteq \{0,+1,-1\}^E$ and a set of queries $W=\{(u_1, v_1), \ldots, (u_L, v_L)\}$ such that $|W|, |S| \geq w(1)$.

W is low-bias with respect to S.

For all $\delta \in S$, $\forall (u, v) \in V \times V$, $|d_{G_\delta}(u, v)-d_G(u, v)| \leq d$.

For any $D \in \{a_1, a_2\}^{|W|}$, there is a unique $\delta \in S$ such that $\forall i, d_{G_\delta}(u_i, v_i)=d_G(u_i, v_i)+D(i)$.

These conditions simply require the approach to identify many independent changes which can be made consistently and do not make reference to an adversary. Thus, the non-adversarial approaches described herein fit into this framework. Let K be the number of providers. Equivalently, let log K be the number of bits to be encoded. Without loss of generality, assume $a_2 > a_1$.

Marking Process

For each provider r, a random vector $\vec{B}^r \in \{+1,-1\}^L$ is chosen. From this vector, a vector D is obtained such that $D(i)=a_2$ if $B^r(i)=+1$ and $D(i)=a_1$, otherwise. D is utilized to construct $\delta_r$ as guaranteed by the framework conditions and output the graph $G_{\delta_r}$ with length function $l_{\delta_r}=l+\delta_r$.

Detection Process

Given access to a suspect map, an implied L-dimensional vector $\vec{Z}$ is computed. This vector defined by $Z(i)=A(u_i, v_i)$. Let $X(i)=d_G(u_i, v_i)$ and define $$a_{mid} = \frac{a_1 + a_2}{2}, a_{diff} = \frac{a_2 + a_1}{2}.$$

For each provider r, a similarity measure is computed:

$$sim(\vec{B}^r, \vec{Z}) = \frac{1}{a_{diff}} \vec{B}^r \cdot (\vec{Z} - (\vec{X} + a_{mid} \vec{1}))$$

Choosing a threshold parameter, for example, t=0.1, if $sim(\vec{B}^r, \vec{Z}) \geq tL$, then we say that the provider r is responsible for the suspect copy.

By operating in this framework, the problem of watermarking graphs is reduced to one of watermarking vectors. Associated with the graph G is a vector $\vec{X}$ which describes the correct answers to the queries in W in the original graph G. In marking, the owner implicitly generates a vector $\vec{Y}$ with $Y(i)=X(i)+a_{mid}+a_{diff}B(i)$, representing the correct answers in the modified graph. Finally, the owner obtains a vector $\vec{Z}$ from his queries to the provider. From the bounded distortion assumption, which is assumed throughout this section, $\forall i, |Z(i)-X(i)| \leq d'$.

There are two possible sources of error we must consider: false positives (incrimination of an innocent provider) and false negatives (successful evasion by a guilty provider).

False Positives

The probability that an individual suspect provider generates a false positive is small, even for an adversary with access to the original map. We examine the $\vec{Z}$ computed by the detector from its queries to the suspect provider. First, consider the probability that it incriminates a fixed provider whose $\vec{B}$ is unknown to the suspect. Using Chernoff bounds, it can be shown that given any valid $\vec{Z}$, $\Pr[sim(\vec{B}, \vec{Z}) > tL] \leq e^{-q^2 t^2 L/2}$ when $\vec{B}$ is generated randomly independent of $\vec{Z}$ and $$q = \frac{a_{diff}}{d' + a_{mid}}.$$

When the detector is run, $\vec{Z}$ is compared against K such $\vec{B}$'s, one for each user. Thus, the probability that any provider is wrongly incriminated is at most $Ke^{-q^2 t^2 L/2}$. Since t and q are constants, this corollary follows:

If $L=\Omega(\log K)$, then the probability of a false positive error by the detector is $o(1)$.

False Negatives

The probability of a false negative (a guilty party evading detection) is also low. Fix a provider r; define $\vec{B}=\vec{B}^r$ and $Y(i)=l_{\delta_r}(e_i)$. If the provider succeeds in fooling the detector, then he has also implicitly generated a $\vec{Z}$ such that $(\vec{Z}-\vec{Y})$ is anticorrelated with $\vec{B}$. If $sim(\vec{B}, \vec{Z}) < tL$, then $\vec{B} \cdot (\vec{Z}-\vec{Y}) < -a_{diff}(1-t)L$. Given such a $\vec{Z}$, the provider has a nonnegligible advantage in predicting $\vec{B}$ by employing a strategy of guessing B(i) based on the value of Z(i)−Y(i).

Let $0<c<d'+1$ be a constant. Given the vector $\vec{Y}$ and a vector $\vec{Z}$ such that (i) $\vec{B}\cdot(\vec{Z}-\vec{Y})<-c$: and (ii)∀i, |Z(i)−Y(i)|≤d'+1, there is an process which produces a vector $\vec{C}$ such that $$\sum_i [C(i) = B(i)] \geq \frac{L}{2} + \frac{cL}{4(d'+1)}$$

with probability at least $1-e^{-\Omega(L)}$.

Finally, predicting B allows the provider to predict the value of Δ(u, v) for (u, v)∈W. Thus, W is a counter example to the unpredictability of S, the set of all changes made, in violation of the limited knowledge assumption. If $$\gamma < \frac{1}{9(d'+1)}$$

and $p \geq e^{-o(L)}$, then the probability of a false negative by the detector is at most 2p. Combining this with the false positive analysis, we obtain the result that given a approach consistent with the framework, $$\gamma < \frac{1}{9(d'+1)},$$

and $p \geq e^{-o(L)}$, O(L) bits can be encoded such that the probability of error by the detector is at most max {2p, o(1)}.

Distance Model

This method can be used to translate the nonadversarial results to the adversarial setting. This process is described below for the additive distortion distance model, and results for the additive edge model follow from similar arguments. To do so, both marking approaches (for the cases $L \geq L_0$ and $L<L_0$) are considered. For each, S, W, and $a_2, a_1$, are defined, and show that the conditions outlined above are satisfied.

If $L \geq L_0$, we define $W=\{(u_{i_j-1}, u_{i_j})|u_{i_j}\in X\}$, and $a_2=0$, $a_1=-1$. S is then the set of vectors δ obtained by taking either $\{\delta(u_{i_j-1}, u_{i_j})=-1, \delta(u_{i_j}, u_{i_j+1})=+1\}$ or $\{\delta(u_{i_j-1}, u_{i_j})=0, \delta(u_{i_j}, u_{i_j+1})=0\}$ independently for each $u_{i_j}\in X'$.

Choosing $L_0=n^{1/2-\epsilon}$, |W| is $\Omega(n^{1/2-\epsilon})$, and |S| is exponential in |W|. W is low-bias with respect to S, since each edge $(u_{i_j-1}, u_{i_j})$ is assigned 0 or −1 with equal probability. The maximum distortion introduced by any set of changes δ∈S is 3. For every $D\in\{a_1,a_2\}^{|W|}$, we set $\delta(u_{i_j-1}, u_{i_j})=D(i)$, and $\delta(u_{i_j}, u_{i_j+1})=-D(i)$, obtaining the unique element of S with this property. Thus, the number of bits which can be encoded is $\Omega(|W|)=\Omega(n^{1/2-\epsilon})$.

Similarly, if $L<L_0$, we choose a marking set $V^*$ of size $O(n^{1/2-\epsilon})$ which is randomly pruned, and produce S by taking, independently for each u∈V*, $\{\forall v\in N(u), \delta(u,v)=+1\}$. For each u∈V*, let $v_u$ be its associated edge. We now choose $W=\{(u,v_u)\}$, $a_2=+1$, $a_1=0$. Since $L_0=n^{1/2-\epsilon}$, |W| and |S| are w(1), and the arguments above show that the distortion is at most $$d = \left\lceil \frac{1}{\epsilon} \right\rceil.$$

Given $D\in\{a_1,a_2\}^{|W|}$, we obtain a unique element of S by, for all $(u,v_u)\in W$, setting δ(u,u')=D(i) for all u'∈N(u). As earlier, the number of bits encoded is $\Omega(n^{1/2-\epsilon})$, and we obtain the following result. There is a marking approach that encodes $\Omega(n^{1/2-\epsilon})$ bits with additive distortion $1/\epsilon, 0<\epsilon<\frac{1}{2}$ in the adversarial distance model.

Distance Model, Additive Distortion, Nonadversarial

FIGS. 2, 3 and 4A illustrate further aspects of marking approaches utilizing a nonadversarial additive distance model described above. Let G=(V,E) be a graph on a set V of n nodes with a set E of edges. Each edge connects a pair of nodes and is denoted by $e=(v_1, v_2)$. for each such edge, let l(e) or $l((v_1, v_2))$ denote the length of the edge. A path P is a set of nodes $v_1, \ldots, v_k$ such that for each i, $(v_i, v_{i+1})\in E$. Given two nodes $v_1, v_2$, the distance $d(v_1, v_2)$ is the length of the shortest path connecting them. In decoding, we make a sequence of queries. Each query asks about two nodes ($v_1$, $v_2$), and returns the distance $d(v_1, v_2)$ in the modified graph.

Our process splits into two main cases: Case I, in which there is a shortest path P in the graph G which uses many (at least $L_0$) edges, and Case II in which all shortest paths in G use few (less than $L_0$) edges. $L_0=O(n^{1/2-\epsilon})$ is a parameter set to balance the two cases. The process begins by examining the graph to see which of the two cases holds. In a first case, modifications are made only to nodes along one long path P. In a second, changes are made to a subset of nodes spread over the whole graph.

Case I:

Fix some path P with length $L \geq L_0$ which is a shortest path connecting $u_1$ and $u_L$ be the nodes along the path P, and let X be the set of nodes $u_i \in P$ such that i is even. For every $X' \subset X$, we produce a different marked graph, and given a marked graph, we show how to reconstruct the set of X' used to mark it. Thus, we can encode $|X| \geq L/2$ bits by using the bits to specify a subset X' of X.

Encoding:

For each $u_{i_j} \in X'$, we decrease the length of the edge $(u_{i_j-1}, u_{i_j})$ by 1 and increase the length of all other edges incident on $u_{i_j}$ by 1.

Decoding:

For each i with $u_i \in X$, query $(u_{i-1}, u_i)$. The distance is either $l((u_{i-1}, u_i))-1$ (in which case $u_i \in X'$ or $l((u_{i-1}, u_i))$ (in which case $u_i \notin X'$). From this, the set X', and thus the encoded bits, can be determined.

Case II:

In this case, the process goes through three steps. First, it finds a set of nodes, called a marking set, which has good properties. Second, it removes some nodes from this marking set. Finally, changes are made to the neighborhoods of nodes in this restricted marking set.

First, we find a set of nodes $\hat{V}$ which is an ε-good node marking set; that is, $\hat{V}$ has the property that if we increase the lengths of all edges incident on $\hat{V}$ by 1, no distance changes by more than $\lceil 1/\epsilon \rceil$. By computing all distances before and after, we can check whether a set of nodes is an ε-good node marking set.

One way to generate a good marking set is randomly. If $\hat{V}$ is chosen by picking each node in V independently with probability $p=1/(L_0 n^{2\epsilon})$, then there is a constant probability that an ε-good node marking set of size Ω(pn) is obtained. Generate one such set randomly, then check to see if it is in fact a good marking set. Repeat until a good marking set is generated.

Now, for each node in the marking set, a short edge incident is associated on it. More precisely, for each u∈$\hat{V}$, let $v_u$ be such that $(u, v_u)$ is a shortest edge incident on u. However, we want the property that for any two nodes u, u'∈$\hat{V}$, u≠u', and u'≠$v_u$. To obtain this, we look at the graph induced by the edges $(u, v_u)$ and choose a maximal independent set V*. Such a set includes at least half of the nodes in $\hat{V}$, since each node in the induced graph causes only one edge.

A different marked graph is produced for each $V' \subseteq V^*$, allowing the encoding of $|V^*|=\Omega(pn)$ bits.

Encoding: For each edge $e=(v_1, v_2)$, if $v_1 \in V'$ or $v_2 \in V'$, increase the length of e by 1.

Decoding: Query $(u, v_u)$ for all $u \in V^*$. If the distance is $l((u, v_u))+1$, $u \in V'$, otherwise $u \notin V'$.

Route Model, Multiplicative Distortion, Nonadversarial

Figure 4B:
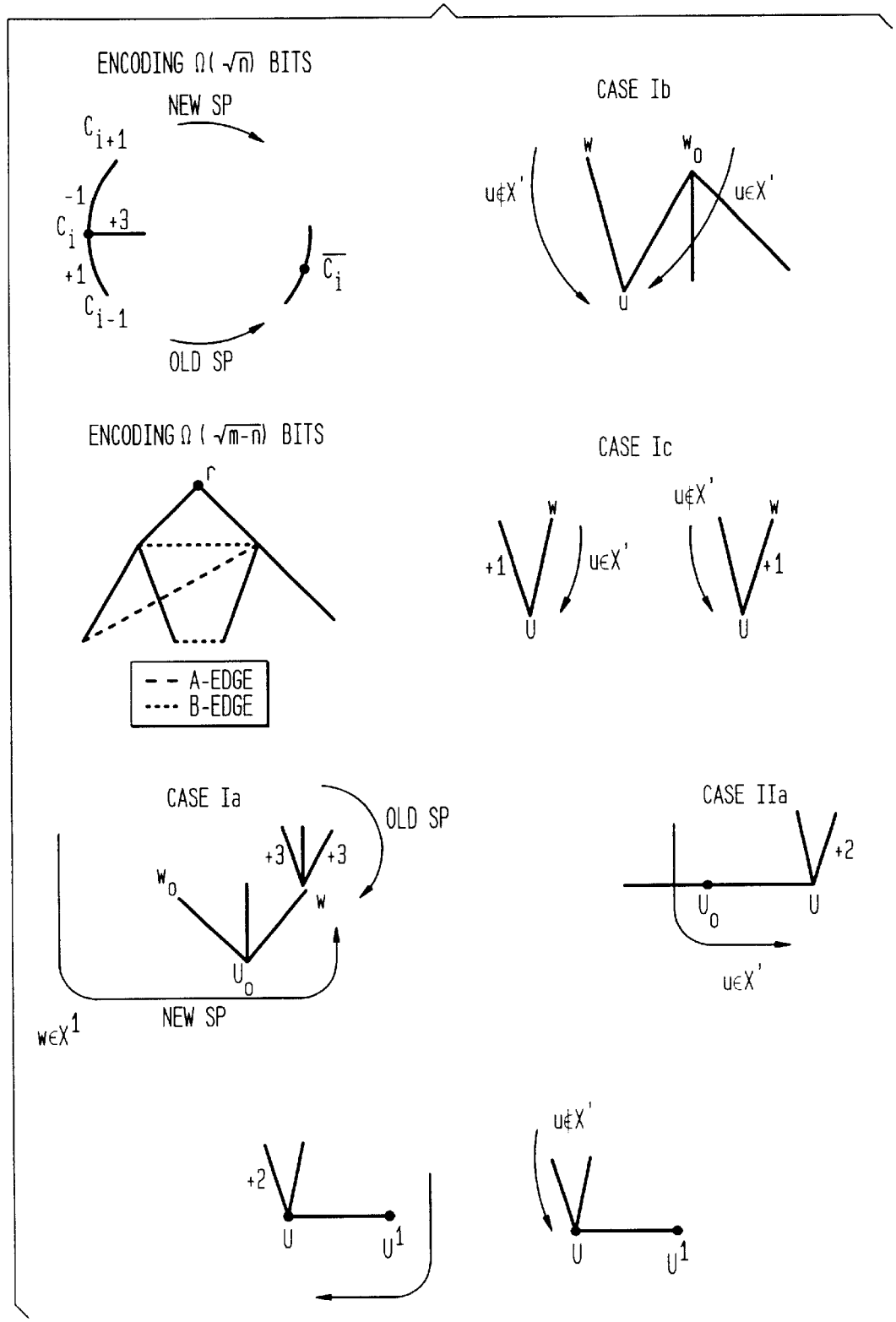
FIG. 4B illustrates aspects of marking approaches utilizing a nonadversarial multiplicative route model in accordance with the present invention.

FIG. 4B illustrates aspects of marking approaches utilizing a nonadversarial multiplicative route model in accordance with the present invention. Here, two main processes are employed. The first encodes $\Omega(\sqrt{n})$ bits, while the second encodes $\Omega(\sqrt{m-n})$. The first process is used if $m \approx n$ and the second otherwise. This combination allows encoding $\Omega(\sqrt{m})$ bits.

Throughout, it is assumed that the graph $G=(V,E)$ has uniform edge weight 1 and the goal is to achieve small multiplicative distortion. If the weights are nearly-uniform instead of uniform, we can first make the weights uniform, introducing a small multiplicative distortion, and then apply these processes to the modified graph.

1. Encoding $\Omega(\sqrt{n})$ Bits

Let L be the length of the longest minimal cycle in G.

Case I: If $L \geq \sqrt{n}$, fix a longest minimal cycle $C=c_1 \ldots, c_L$, and let X be the set of nodes $c_i$ for which i is even and $i<L/2$. Any arithmetic on the indices i is assumed to be mod L (that is, $c_{L+1}=c_1$). Given such a cycle, we say that a path from $c_i$ to $c_j$ on the cycle is clockwise if it goes through $c_{i+1}$, and counterclockwise otherwise. For each node $u \in X$, we associate a antipodal node $\bar{u}=c_j$, where j is the smallest value for which the counterclockwise path from u to $c_j$ is strictly shorter than the clockwise one. For each subset $X' \subseteq X$, we produce a marked copy, thus encoding $\Omega(\sqrt{n})$ bits.

Encoding: For each node $c_i \in X'$, modify its neighborhood as follows: Increase the length of $(c_{i-1}, c_i)$ by 1 and decrease the length of $(c_i, c_{i+1})$ by 1. Increase the lengths of all other edges incident on $c_i$ by 3.

Decoding: For each $c_i \in X$, query the pair $(c_i, c_{\bar{i}})$. If the first edge of this path is the clockwise edge $(c_i, c_{i+1})$, then $c_i \in X'$, else $c_i \notin X'$.

Case II: If $L<\sqrt{n}$, then all minimal cycles have length at most $\sqrt{n}$. Since the graph is 2-edge-connected, every node lies on some cycle, and thus on a minimal cycle. For each node u, associate a minimal cycle $C^u$ of nodes $\{C_1^u, C_1^u, \ldots\}$ where $C_1^u=u$.

The first step is to construct a set of pairs $P=\{(u, C^u)\}$ such that for each cycle $C^u$ which appears in P, u is the only node in $C^u$ which appears in P. To do so, we start by constructing a bipartite graph H whose left nodes correspond to the nodes of G, and whose right nodes correspond to the cycles $C^u$. There is an edge between the nodes corresponding to v and $C^u$ if $v \in C^u$ in G. We then repeat the following procedure until no more nodes remain in H: Choose a left node u of lowest degree in H. Place $(u, C^u)$ in P, and remove all nodes incident on u or $C^u$. Each iteration removes at most $O(\sqrt{n})$ left nodes (because the cycles contain at most $\sqrt{n}$ nodes) and $O(\sqrt{n})$ right nodes (because we chose a left node of lowest degree), so at least $\Omega(\sqrt{n})$ pairs are selected.

Let X be the set of nodes u such that $(u, C^u) \in P$. For each $u \in X$, we define a node $\bar{u}$ with respect to $C^u$ as before (that is, it is the farthest node for which the shortest path in $C^u$ goes counterclockwise). We generate a marked copy for each $X' \subseteq X$, encoding $O(\sqrt{n})$ bits.

Encoding: For each $u \in X'$, mark it as in the previous case.

Decoding: For each $u \in X'$, query $(u, \bar{u})$. If the first edge of this path is the clockwise cycle edge $(C_1^u, C_2^u)$, then $u \in X'$, else $u \notin X'$.

2. Encoding $\Omega(\sqrt{m-n})$ Bits

Let T be a breadth-first search (BFS) tree rooted at some node r. The marking approach is designed around this tree T. Let $V_i$ denote the set of nodes at distance i from r in T; we refer to them as the nodes at level i. Also, any edge of G that is not in T is referred to as a non-tree edge. Let $m'=m-n+1$ be the number of non-tree (non-cut) edges in G.

The non-tree edges of G are partitioned into sets $E_1, E_2, \ldots$ such that $E_i$ contains all edges whose lower endpoint is at level i. These sets are then divided into four classes, $C_0, C_1, C_2$ and $C_3$ where $C_j=\{E_i | i \bmod 4=j\}$. One of these classes, say C, must have at least $m_0=m'/4$ non-tree edges. This marking approach focuses on the edges in the class C; let $I=\{j|E_i \in C\}$.

Edges in the class C are marked and the levels in between are used as a buffer to ensure that changes to one level do not alter the depths of nodes in subsequent levels. When marking a level i, the following properties are ensured:

Edge lengths are changed only within and between levels i, i−1, i−2.

Any edge length is increased by at most 4. This ensures a multiplicative distortion of at most 4.

Finally, after marking level i, for each node v in level i+1, we increase the lengths of edges entering from level i to ensure that the depth of v is exactly i'+5 where i' denotes the depth of level i before we start marking it. Thus, after each marking step, remaining nodes shift even further downwards, but end up in the same classes.

The marking strategy is now described in further detail. We proceed through levels, starting at the root and marking each level $i \in L$. Let $a_i$ denote the number of non-tree edges (referred to as a-edges) that connect nodes at level i−1 to nodes at level i, and let $b_i$ denote the number of non-tree edges whose endpoints are both nodes at level i (referred to as b-edges). Let $$A = \sum_{i|E_i \in C} a_i$$

be the number of a-edges, and $$B = \sum_{i|E_i \in C} b_i$$

be the number of b-edges. Clearly, $A+B \geq m'/4$. We consider two cases, depending on whether $A \geq B$ or $B>A$.

Case I: $A \geq B$

We show that at any level i, we can encode $\Omega(\sqrt{a_i})$ bits of information. This implies that we can encode $\Omega(\Sigma_i \sqrt{a_i})=\Omega(\sqrt{m'})$ bits of information overall. Let $\deg_a(z)$ be the degree of a node $z \in V_{i-1} \cup V_i$, counting only the non-tree edges connecting nodes in $V_{i-1}$ to level $V_i$. We consider 3 subcases:

$\exists v_0 \in V_i$ with $\deg_a(u_0) \geq \sqrt{a_i}$: Pick some node $w_0 \in V_{i-1}$ that is adjacent to $u_0$. Let X be the set of nodes in $V_{i-1} \backslash w_0$ that are adjacent to $u_0$. For each $X' \subseteq X$, we produce a marked graph as follows.

Encoding: For each $w \in X'$, increase the lengths of all edges entering w from $V_{i-2} \cup V_{i-1}$ by 3.

Decoding: For each $w \in X$, query $(r, w)$. If $u_0$ lies on this path, then $w \in X'$, else $w \notin X'$.

$\exists w_0 \in V_{i-1}$ with $\deg_a(w_0) \geq \sqrt{a_i}$: Let X be the set of nodes in $V_i$ that are adjacent to $w_0$ and $X' \subseteq X$.

Encoding: For each $u \in X$, the r~u path in T uses a tree edge connecting it to some node $w \neq w_0$. If $u \in X'$, we increase the lengths of all edges entering u from $V_{i-1} \cup V_i$ except $(u, w_0)$ by 1; otherwise, we increase the length of $(u, w_0)$ by 1.

Decoding: For each u∈X, query (r, u). If $w_0$ lies on this path, then u∈X' else u∉X'.

$\forall u \in V_i \deg_a(u) < \sqrt{a_i}$ and $\forall w \in V_{i-1} \deg_a(w) < \sqrt{a_i}$: Let $A_i$ be the set of non-tree edges connecting nodes in $V_i$ to nodes in $V_{i-1}$. Pick an edge(u, w)∈$A_i$ where u∈$V_i$ and w∈$V_{i-1}$ and remove from $A_i$ all edges that are adjacent to either u or w. Add the ordered pair {u, w} to a set S and repeat this process till there are no more edges left in $A_i$. Since each step removes at most $2\sqrt{a_i}$ edges from $A_i$, upon termination, the set S contains at least $(\sqrt{a_i}/2)$ pairs.

If (u, w) is a pair in S, then we say that u and w are partners. Let X be the set of u∈$V_i$ which appear in S, and let X'⊆X.

Encoding: For each u∈X, let w be the partner of u in the tree T. If u∈X', increase the length of all edges entering u from $V_{i-1} \cup V_i$ except (w, u) by 1; otherwise, increase the length of the edge (w, u) by 1.

Decoding: For each u∈X, query (r, u). If the path goes through the partner of u, then u∈X', else u∉X'.

Case II: B>A

We show that at any level i, we can encode at least an Ω($\sqrt{b_i}$) bits of information. This implies that we can obtain Ω($\Sigma_i \sqrt{b_i}$)=Ω($\sqrt{m'}$) bits of information overall. Let $\deg_b(u)$ be the degree of a node u at level i counting only the edges that are within the level. We consider 2 subcases:

∃$u_0$∈$V_i$ with $\deg_b(u_0) \geq \sqrt{b_i}$: Let X be the set of nodes u∈$V_i$ adjacent to $u_0$, and X'⊆X.

Encoding: For each u∈X', increase the length of every edge entering u from $V_{i-1} \cup V_i$ by 2, except for the edge (u, $u_0$).

Decoding: For each u∈X, query (r, u). If $u_0$ is on this path, then u∈X'.

$\forall u \in V_i \deg_b(u) < \sqrt{b_i}$: Let $B_i$ be the set of edges connecting nodes in $V_i$. Pick an edge u, u')∈$B_i$ and delete from $B_i$ any edges that are incident on u or u'. Add the ordered pair {u, u'} to a set S and repeat this process till there are no more edges left in $A_i$. Since each step eliminates at most $2\sqrt{b_i}$ edges, upon termination |S|≥$\sqrt{b_i}/2$.

Let X be the set of nodes u such that (u, u')∈S, and let X' ⊆X.

Encoding: For each u∈X, if u∈X', increase all edges entering u from $V_{i-1} \cup V_i$ except (u, u') by 2.

Decoding: For each u∈X, query (r, u). If u' is on the path, then u∈X'.

Distance Model, Additive Distortion, Adversarial

Returning to the adversarial distance model with additive distortion described above, we disclose a general method for turning nonadversarial watermarking approaches in the distance model with additive distortion into adversarial ones, making them more robust against pirates trying to hide their identities. This approach is presented in a general way because the nonadversarial watermarking approach described earlier consists of multiple approaches, one of which is chosen depending on the larger number of edges in a shortest path.

As before, a graph G is defined with vertex set V and edge set E, and edge lengths l(e). Given a vector δ∈$Z^E$, a length function $l_\delta$ is defined such that $l_\delta(e)=l(e)+\delta(e)$. $G_\delta$ denotes the graph G with length function $l_\delta$.

The framework of the present invention requires that the nonadversarial watermarking approach satisfy some conditions. First, the approach provides a pair of distinct values $a_1, a_2 \in \{0,+1,-1\}$, a set S⊆$\{0,+1,-1\}^E$, and a set of queries W={($u_1,v_1$), . . . , ($u_L,v_L$)}.

An element $s_r$∈S corresponds to the set of changes made to the edges for a particular user r, and this S is the set of all possible changes. W is the set of queries used to identify a user. For each query ($u_i,v_i$)∈W, the distance $d_{G_\delta}(u_i,v_i)=d_G(u_i,v_i)+a_1$ or $d(u_i,v_i)+a_2$ in every marked graph. For example, in Case I of the method for the nonadversarial distance model, W is the set of queries to ($u_{i-1},u_i$), $a_1, a_2=\{-1, 0\}$ since the length of the queried edge either decreases 1 or remains the same.

For each provider r, we chose a random vector $\vec{B}^r \in \{+1,-1\}^L$. From this vector, we obtain a vector D by $$D(i) = \begin{cases} a_2 & \text{if } B^r(i) = +1 \\ a_1 & \text{if } B^r(i) = -1 \end{cases}$$

Now, let δ be the unique element of S for which $$\forall i, d_{G_\delta}(u_i,v_i)=d_G(u_i,v_i)+D(i).$$

and distribute the graph $G_\delta$ to provider r.

Given access to a suspect map, let A(u,v) be the adversary's answer to the query u,v). An implied L-dimensional vector $\vec{Z}$ is computed, defined by $Z(i)=A(u_i,v_i)$. Let $X(i)=d_G(u_i,v_i)$ and define $$a_{mid} = \frac{a_1 + a_2}{2}, \; a_{diff} = \frac{a_2 + a_1}{2}.$$

For each provider r, we then compute a similarity measure $$sim(\vec{B}^r, \vec{Z}) = \frac{1}{a_{diff}} \vec{B}^r \cdot (\vec{Z} - (\vec{X} + a_{mid} \vec{1}))$$

Choosing a threshold parameter t=9.1, if sim $(\vec{B}^r, \vec{Z}) \geq tL$, then we say that the provider r is responsible for the suspect copy. This value of t is simply chosen for concreteness: other values 0<t<1 offer constant-factor tradeoffs between the number of bits which can be encoded and the security of the approach.

In addition, we require

For all δ∈S, ∀(u,v)∈V×V, $|d_{G_\delta}(u,v)-d_G(u,v)| \leq d$.

For any D∈$\{a_1,a_2\}^{|W|}$, there is a unique δ∈S such that $\forall i, d_{G_\delta}(u_i,v_i)+D(i)$. That is, the underlying nonadversarial marking approach introduces distortion at most d, and that for every possible set of responses to the L queries, there is one δ∈S such that $G_\delta$ is consistent with those responses.

To allow all users to be encoded successfully, we desire that L=Ω(log n), implying that W and S are sufficiently large. In addition, for security we require that for every query drawn from W, the change in distance is at most 1 and no single value predominates as we vary over S. This second property is made formal by requiring that W is low-bias, as defined below. W⊆V×V is low-bias with respect to S ⊆$\{0,+1,-1\}^E$ if for all (u,v)∈W, $$|\Delta(u, v)| \leq 1 \; \& \forall z \in \{0, +1, -1\}, \Pr_{\delta \in S}[\Delta(u, v) = z] \leq 1/2$$

Figure 5:
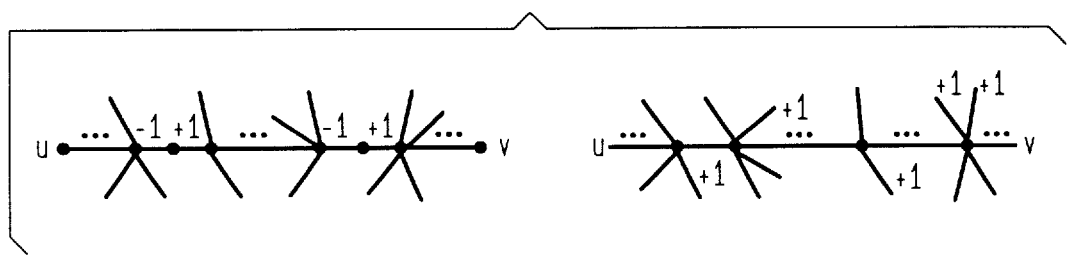
FIG. 5 illustrates aspects of marking approaches utilizing an additive edge model in accordance with the present invention.

All of the nonadversarial watermarking approaches for the distance model with additive distortion given earlier fall into this framework. For example, in the case that there was a shortest path with L≧$L_o$ edges, we define W={($u_{j-1},u_i$) $|u_{i_j}$∈X}, and $a_2=0, a_1=-1$ as seen in FIG. 5 which illustrates marking approaches for the additive distortion measure in the edge model. S is then the set of vectors δ obtained by taking either {δ($u_{i_{j-1}},u_{i_j}$)=−1, δ($u_{i_j},u_{i_{j+1}}$)=+1} or {δ($u_{i_{j-1}},u_{i_j}$)= 0, δ($u_{i_j},u_{i_{j+1}}$)=0} independently for each $u_{i_j}$∈X'.

While the present invention is disclosed in the context of several presently preferred embodiments, it will be recognized that a wide variety of implementations may be employed by persons of ordinary skill in the art consistent with the above discussion and the claims which follow below. By way of example, while the discussion principally addresses the watermarking of map data, it will be recognized that it can be adapted and applied to other data structures defined by nodes, edges and distances between nodes, such as data for the routing patterns of communication connections and the like. Additional mathematical analysis is provided in the Appendix which follows.

APPENDIX

A. Non-Adversarial Models

Further details of our marking approaches for the edge model in the non-adversarial setting (for both additive and multiplicative distortion measures) as well as the approaches for the distance model with multiplicative distortion measure and the route model are provided below.

A.1. The Edge Model

A.1.1. The Additive Distortion Measure

Let $P \in P(G)$ be a shortest path in G with a largest number of edges on it and let L denote the number of edges on P. Our marking approach depends on whether or not L exceeds a certain threshold value $L_0$ (to be determined later). Let $u_0, u_1, \ldots, u_L$ be the nodes along the path P. $L \geq L_0$:

In this case, the marking approach focuses on the path P. Let X be the set of nodes $u_i$ such that i is odd and let $Y \subset X$ be the set of nodes of degree two on this set. If at least a ($\frac{1}{3}$)-fraction of nodes in X have degree two, we use the following procedure to create a marked copy for each $Y' \subseteq Y$. Let $u_{i_1}, \ldots, u_{i_k}$ be the nodes in Y'. We create a marked copy G' by modifying the length function l to l' in the following manner. For each $u_{i_j} \in Y'$, we set $l'((u_{i_{j-1}}, u_{i_j})) = l((u_{i_{j-1}}, u_{i_j})) - 1$ and $l'((u_{i_j}, u_{i_{j+1}})) + 1$. The remaining edge lengths are kept unchanged. See FIG. 5, for example.

Our detection process is to simply query the length of every edge in P that is incident on some node of Y. This allows us to uniquely identify the copy G' of the provider. Clearly, this approach gives us $|Y| \geq |X|/3 \geq L_0/6$ bits. The proposition below shows that this approach introduces only a small additive distortion.

For any pair x, y of nodes, $|d_{G'}(x,y) - d_G(x,y)| \leq 1$.

Let P be any shortest path in a graph G. Then for any two nodes x and y that do not lie on this path, there exists a shortest path P' in G such that P' intersects P at most once.

On the other hand, if at least a ($\frac{2}{3}$)-fraction of the nodes in X have degree 3 at least, then we proceed as follows. Let F be the set of edges that are incident on some node in X\Y but that do not lie on P. Clearly, $|F| \geq |X\Y|/2 \geq L_0/6$. For each subset $F' \subseteq F$. we create a marked copy G' by modifying the length function l to l' in the following manner. We increment the length of every edge in F' by 1 and keep all other edge lengths unchanged. Our detection process queries the length of every edge in F and these lengths uniquely identify the copy G' of the provider. This approach gives us $|F| \geq L_0/6$ bits. Moreover, only a small additive distortion is introduced.

For any pair x, y of nodes, $|d_{G'}(x,y) - d_G(x,y)| \leq 2$.

$L < L_0$: In this case we know that every pair of nodes in G is connected by a shortest path with at most $L_0$ edges on it. We use this property to design an efficient marking approach via the probabilistic method.

Given a set $E' \subseteq E$, an E'-edge marking of the graph G is a graph G' with a length function l' defined as below:

$$l'(e) = \begin{cases} l(e) + 1 & \text{if } e \in E' \\ l(e) & \text{otherwise} \end{cases}$$

We call a set E' of edges an $\epsilon$-good edge marking set if the graph G', the E'-edge marking of G satisfies the following property:

$d_{G'}(x,y) - d_G(x,y) < \lceil 1/\epsilon \rceil$.

The following proposition shows that an $\epsilon$-good edge marking set of large size can be found at random.

Let E' be a set of edges obtained by randomly choosing each edge in E with probability $p = 1/(L_0 n^{2\epsilon})$. Then the set E' is an $\epsilon$-good edge set of size $\Omega(pm)$, with probability at least $\frac{1}{4}$.

Consider any path $P_i \in P(G)$ in this collection. The probability that E' contains at least $d = \lceil 1/\epsilon \rceil$ edges from this path $P_i$ is bounded by $$\binom{L_i}{d} p^d \leq (L_0)^d p^d = \frac{1}{n^{2\epsilon d}} \leq \frac{1}{n^2}.$$

If we let G' denote an E'-edge marking of G, then for any pair u, v of nodes, $$Pr[(d_{G'}(u,v) - d_G(u,v)) \geq \lceil 1/\epsilon \rceil] \leq \frac{1}{n^2}.$$

Thus with probability at least $\frac{1}{2}$, additive distortion of G'is bounded by d. Moreover, Chernoff bounds allows us to conclude that $|E'| = \Omega(pm)$ with probability at least $\frac{3}{4}$ (say).

We start by constructing an $\epsilon$-good edge marking set with $\Omega(pm)$ edges. This is done by simply repeating the random experiment outlined above and verifying if it satisfies the desired properties. Let $E^*$ be an edge set found in this manner. For each subset $E'' \subseteq E^*$, we create a marked copy G' by taking the E'-edge marking of G. The detection process simply queries the length of every edge in $E^*$. It is easy to see that we obtain $\Omega(pm)$ bits via this approach.

Our approaches for the two cases can be combined together to obtain the following result.

There is a marking approach that gives $\Omega(m^{1/2-\epsilon})$ bits of information with only an additive distortion of $\lceil 1/\epsilon \rceil$ for any $0 < \epsilon < \frac{1}{2}$.

The marking approaches above give $\Omega(L_0)$ bits when $L \geq L_0$, and $m/(L_0 n^{2\epsilon})$ bits otherwise. Choosing the parameter $L_0$ to be $m^{1/2-\epsilon}$, we get the desired result.

A.1.2. Multiplicative Distortion Measure

We now show that if we are allowed even a small multiplicative distortion of the form (1+o(1)), we can obtain $\tilde{O}(m)$ bits of information. The idea is to use the probabilistic method to construct an edge marking set that is both large and introduces only a small multiplicative distortion. The important difference is that we can now pick edges with a much larger probability, say $p = 1/\log^2 n$, and use Chernoff bounds to claim that almost certainly any shortest path is stretched by a factor of (1+o(1)).

There is a marking approach that gives $\tilde{O}(m)$ bits of information with only a (1+o(1))-multiplicative distortion.

A.2. The Distance Model

A.2.1. Multiplicative Distortion Measure

Using ideas similar to the ones sketched in Section A.1.2, we can show the following.

There is a marking approach that gives $\tilde{O}(n)$ bits of information with only a (1+o(1))-multiplicative distortion.

A.3 The Route Model

We now examine the situation where the end-user interface only provides the routes and not necessarily the distance values associated with them. As mentioned earlier, this limitation on the information greatly limits the owner's ability to encode information. For some graphs, particularly those where the edge lengths are large, it is not possible to encode more than a small amount of information.

Because of this, we focus our attention on graphs whose length function is not too large. We say that a length function l is nearly-uniform if the ratio of the maximum to minimum edge length is bounded. We focus on such length functions in this section. Nearly-uniform length functions are convenient in multiplicative distortion settings, since we can begin by distorting all weights to the minimum while only introducing constant distortion.

Furthermore, the need for a large number of alternate routing paths led us to place one of two requirements on the graph. Either the graph has an $\Omega(n^\epsilon)$-sized 2-edge connected component, or it satisfies $m \geq n+n^\epsilon$, guaranteeing the existence of many edges beyond those required for connectedness. In each case, we will be able to get constant multiplicative distortion.

Finally, we also present an example of a difficult-to-mark graph in which $\Omega(n)$ bits can be encoded in the unit edge length case, but only $O(\log n)$ if the edge lengths are large.

A.3.1.2 Edge Connected

In the case that the graph contains a large 2-edge connected component, we can encode a polynomial number of bits with additive distortion. We prove the following result whose proof is deferred to the final version.

There is a marking approach which encodes $O(n^{1/4-\epsilon})$ bits in a 2-edge connected graph with multiplicative distortion $O(1/\epsilon)$.

A.3.2. The Many Edges Case

Let T be a breadth-first search (BFS) tree rooted at some node r. We design our marking approach around this tree T. Let $V_i$ denote the set of nodes at distance i from r in T; we refer to them as the nodes at level i. Also, any edge of G that is not in T is referred to as a non-tree edge. Let $m'=m-n+1$ be the number of non-tree (non-cut) edges in G.

We partition the non-tree edges of G into sets $E_1$, $E_2$, ... such that $E_i$ contains all edges whose lower endpoint is at level i. These sets are then divided into four classes, $C_0$, $C_1$, $C_2$ and $C_3$ where $C_j = \{E_i | i \bmod 4 = j\}$. One of these classes, say C, must have at least $m_0 = m'/4$ nontree edges. Our marking approach will focus on the edges in the class C; let $I = \{j | E_i \in C\}$.

We will mark edges in the class C and use the levels in between as a buffer to ensure that changes to one level do not alter the depths of nodes in subsequent levels. When marking a level i, we ensure the following properties:

We allow changing edge lengths only within and between levels e, i-1, i-2.

We ensure that depth of any node at level i is increased by at most 4. This ensures a multiplicative distortion of at most 4.

Finally, after marking level i, for each node v in level i+1, we increase the lengths of edges entering from level i to ensure that the depth of v is exactly i'+5 where i' denotes the depth of level i before we start marking it. Thus after each marking step, remaining nodes shift even further downwards, but end up in the same classes.

$$\sum\nolimits_{i | E_i \in C} a_i +$$

We now describe the marking strategy in more detail. We proceed through levels, starting at root and mark each level $i \in I$. In what follows, for any node v, we use $\delta_v$ to denote an element from $\{+1, -1\}$. Let $a_i$ denote the number of non-tree edges that connect nodes at level i-1 to nodes at level i and let $b_i$ denote the number of non-tree edges that connect nodes at level i. Clearly, $$\sum\nolimits_{i | E_i \in C} a_i + \sum\nolimits_{i | E_i \in C} b_i \geq m'/4$$

We consider two cases, as seen in FIG. 4b, for example.

Case I: $\sum\nolimits_{i | E_i \in C} a_i \geq m'/8$

We show that at any level i, we can encode $\Omega(\sqrt{a_i})$ bits of information. This implies that we can encode $$\Omega\left(\sum\nolimits_i \sqrt{a_i}\right) = \Omega(\sqrt{m'})$$

bits of information overall. Let $\deg_a(Z)$ be the degree of a node $z \in V_{i-1} \cup V_i$, counting only the non-tree edges connecting nodes in $V_{i-1}$ to level $V_i$. We consider 3 subcases:

$\exists u_0 \in V_i$ with $\deg_a(u_0) \geq \sqrt{a_i}$: Pick a node $w_0 \in V_{i-1}$ that is adjacent to $u_0$. For each node $w_0 \in V_{i-1} \setminus \{w_0\}$, increase the lengths of all edges entering w from $V_{i-2} \cup V_{i-1}$ to $3+\delta_w$.

Our detection process uses queries of the form (r, w) where $w \in V_{i-1} \setminus \{w_0\}$ and checks whether or not $u_0$ lies on this path. If $\delta_w$ is negative, then the original shortest path from r to w has increased in length by less than 2 and any r~w path passing through node $u_0$ is strictly longer. On the other hand, if $\delta_w$ is positive, then every shortest r~w path is to the form r~$w_0 \rightarrow u_0 \rightarrow$w.

$\exists w_0 \in V_{i-1}$ with $\deg_a(w_0) \geq \sqrt{a_i}$: Let $N_i(w_0)$ be the set of nodes in $V_i$ that are adjacent to $w_0$. For each $u \in N_i(w_0)$, the r~u path in T uses a tree edge connecting it to some node $w \neq w_0$. We set the length of (u, w) to $1+\delta_u$ and the length of (u, $w_0$) to $1-\delta_u$.

Our detection process uses queries of the form (r, u) where $u \in N_i(w_0)$ and checks whether or not $w_0$ lies on this path. If $\delta_u \geq 0$, then the original shortest path passing through the node w remains shorter than any r~u path that goes through $w_0$. On the other hand, if $\delta_u$ is negative, then every shortest r~u path is of the form r~$w_0 \rightarrow$u.

$\forall u \in V_i \deg_a(w_i) < \sqrt{a_i}$ and $\forall w \in V_{i-1} \deg_a(v_i) < \sqrt{a_i}$: Let $A_i$ be the set of non-tree edges connecting nodes in $V_i$ to nodes in $V_{i-1}$. Pick an edge $(u, w) \in A_i$ where $u \in V_i$ and $w \in V_{i-1}$ and remove from $A_i$ all edges that are adjacent to either u or w. Add the pair $\{u, w\}$ to a set S and repeat this process till there are no more edges left in $A_i$. Since each step removes at most $2\sqrt{a_i}$ edges from $A_i$, upon termination, the set S contains at least $(\sqrt{a_i}/2)$ pairs.

Now for each pair $\{u, w\} \in S$, we encode a single bit as follows. Consider the parent w' of u in the tree T. We set the length of the edge (w', u) to $1+\epsilon_u$ and the length of the edge (w', u) to $1-\epsilon_u$.

If $\epsilon_j \leq 0$, then we simply shortened the BFS tree path to $x_j$, so it remains the shortest path. Otherwise, the shortest path now passes through $y_j$.

The queries are of the form (r, u) for each pair $\{u, w\} \in S$. If $\delta_u < 0$, then no shortest r~u path goes through the node w.

Otherwise, every shortest r~u path is of the form r~w→u.

Case II: $\sum_{i|E_i \in C} b_i \geq m'/8$

We show that at any level i, we can encode at least a $\Omega(\sqrt{b_i})$ bits of information. This implies that we can obtain $$\Omega\left(\sum_i \sqrt{b_i}\right) = \Omega(\sqrt{m'})$$

bits of information overall. Let $\deg_b(u)$ be the degree of a node u at level i counting only the edges that are within the level. We consider 2 subcases:

$\exists w_0 \in V_i$ with $\deg_b(u_0) \geq \sqrt{b_i}$: In this case, for each node $u \in V_i$ adjacent to u, we change the length of every edge incident on u to $2 + \delta_u$, leaving the edge $(u_0, u)$ unmodified.

Our detection process uses queries of the form (r, u) and checks whether or not $u_0$ is on the shortest r~u path. If $\delta_u < 0$, then the shortest r~u path does not pass through the node $u_0$. Otherwise, every shortest r~u path is of the form r~$u_0$→u.

$\forall u \in V_i \deg_b(u) < \sqrt{b_i}$: Let $B_i$ be the set of edges connecting nodes in $V_i$. Pick an edge (u, u')$\in B_i$ and delete from $B_i$ any edges that are incident on u or u'. Add the pair $\{u, u'\}$ to a set S and repeat this process till there are no more edges left in $A_i$. Since each step eliminates at most $2\sqrt{b_i}$ edges, upon termination $|S| \geq \sqrt{b_i}/2$. for each pair $\{u, u'\} \in S$, set all edges incident on u' to 2 and all edges incident on u to $1 - \delta_u$, leaving the edge (u, u') unmodified. The sets of edges modified for any two pairs in S are disjoint because of the way in which the pairs are chosen.

Our detection process uses queries of the form (r, u') for each pair $\{u, u'\} \in S$. If $\delta_u \geq 0$, no shortest r~u' path goes through the node u. Otherwise, every shortest r~u' path is of the form r~u→u'.

Thus we can conclude the following.

There is a marking approach for the uniform length route model that gives $\Omega(\sqrt{m'})$ bits of information with a multiplicative distortion of 4.

A.3.3. The General Case: An Unbounded Distortion Example

We now show that when non-uniform edge lengths are allowed, one cannot encode more than O(log n) bits for any fixed multiplicative distortion d.

Figure 6:
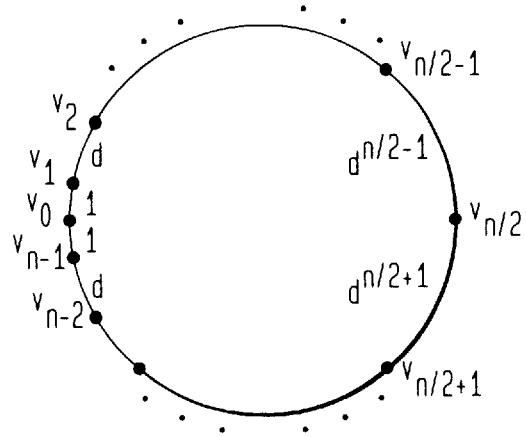
FIG. 6 illustrate various aspects of marking approaches utilizing a route model with a large distance distortion instance in accordance with the present invention.

Let n be even. Consider the following graph G with n nodes $v_0, \ldots, v_{n-1}$ and n edges defined as follows:

$l(v_i, v_{i+1}) = (d+1)^i \quad 0 \leq i \leq n/2 - 1$ $l(v_{n-i}, v_{n-i+1}) = (d+1)^i \quad 1 \leq i \leq n/2 - 1$ Any path between $v_i$, $v_j$ with $i, j \notin \left[\frac{n}{2}, \frac{n}{2} \pm 1\right]$ which does not go through $v_0$ has multiplicative distortion>d, as illustrated in FIG. 6 which illustrates a large distortion instance for the route model.

The length of the path connecting $v_i$ to $v_j$ through $v_{\frac{n}{2}}$ has length at least $2(d+1)^{\frac{n}{2}-1}$, while the path through $v_0$ has length at most $2(1 + d + \ldots + d^{\frac{n}{2}-2}) < 2(d+1)^{\frac{n}{2}-2}$.

Since $(d+1)^{\frac{n}{2}-1} - d(d+1)^{\frac{n}{2}-2} \geq (d+1)^{\frac{n}{2}-2}$, choosing the incorrect path introduces multiplicative distortion>d.

This statement defines the shortest paths for all pairs except those involving $v_i$ with i$\in$ $\left[\frac{n}{2}, \frac{n}{2} \pm 1\right]$.

However, regardless of the distortion allowed, for each such $v_i$ there is a number j(i)$\leq$n such that the direction of the shortest path P to $v_{j(i)}$ to $v_i$ is clockwise, and the shortest path from any node not on P to $v_i$ is counterclockwise. There are only $n^3$ possible values for the triple $\left[j\left(\frac{n}{2}-1\right), j\left(\frac{n}{2}\right), j\left(\frac{n}{2}+1\right)\right]$, and specifying those values defines the shortest paths for all remaining pairs of nodes.

At most O(log n) bits can be encoded in G.

In contrast to this, note that by applying ideas similar to the degree 2 path marking case of the additive edge model, $\Omega(n)$ bits can be encoded with additive distortion 1 in a cycle with unit edge lengths.

B. Adversarial Models

B.1. False Positives

Given any valid $\vec{Z}$, $\Pr[\text{sim}(\vec{B}, \vec{Z}) > tL] \leq e^{-q^2 t^2 L/2}$ when $\vec{B}$ is generating randomly independent of $\vec{Z}$ and $q = \frac{a_{diff}}{d' + a_{mid}}$.

The probability that sim $(\vec{B}, \vec{Z}) > tL$ is computed by the Bounded Distortion Assumption, $\forall i < L, |Z(i) - X(i)| \leq d'$ and thus $|Z(i) - X(i) - a_{mid}| \leq d' + a_{mid}$ Furthermore, B(i)=$\pm$1 with equal probability. Thus, each term in the sum $q \cdot \text{sim}(\vec{B}, \vec{Z}) = \sum_i \frac{1}{d' + a_{mid}} B(i)Z(i) - X(i) - a_{mid})$ has magnitude at most 1 and is independently distributed with expectation 0.

By applying Chernoff bounds $\Pr[q \cdot \text{sim}(\vec{B}, \vec{Z}) \geq qtL] \leq e^{-q^2 t^2 L/2}$ and the result follows.

B.2 False Negatives

If $\text{sim}(\vec{B},\vec{Z})<tL$, then $\vec{B}\cdot(\vec{Z}-\vec{Y})<-a_{\text{diff}}(1-t)L$.

Examine the expression for $a_{\text{diff}}\cdot\text{sim}(\vec{B},\vec{Z})$ $$\begin{aligned}\vec{B}\cdot(\vec{Z}-(\vec{X}+a_{\text{mid}}\vec{1})) &= \vec{B}\cdot(\vec{Z}-\vec{Y})-a_{\text{mid}}\vec{B}\cdot\vec{1}\\ &= \vec{B}\cdot(\vec{Z}-\vec{Y})+\vec{B}\cdot(\vec{Y}-\vec{X})-a_{\text{mid}}\vec{B}\cdot\vec{1}\\ &= \vec{B}\cdot(\vec{Z}-\vec{Y})+\vec{B}\cdot(\vec{X}+a_{\text{mid}}\vec{1}+a_{\text{diff}}\vec{B}-\vec{X})-a_{\text{mid}}\vec{B}\cdot\vec{1}\\ &= \vec{B}\cdot(\vec{Z}-\vec{Y})+a_{\text{diff}}\vec{B}\cdot\vec{B}\\ &= \vec{B}\cdot(\vec{Z}-\vec{Y})+a_{\text{diff}}L\end{aligned}$$

From this, if $\text{sim}(\vec{B},\vec{Z})<tL$, then $\vec{B}\cdot(\vec{Z}-\vec{Y})<-a_{\text{diff}}(1-t)L$.

Let $0<c<d'+1$ be a constant. Given the vector $\vec{Y}$ and a vector $\vec{Z}$ such that $$\vec{B}\cdot(\vec{Z}-\vec{Y})<-cL$$

$$\forall i,\ |Z(i)-Y(i)|\leq d'+1$$

there is an process which produces a vector $\vec{C}$ such that $$\sum_i [C(i)=B(i)] \geq \frac{L}{2}+\frac{cL}{4(d'+1)}$$

with probability at least $1-e^{-\Omega(L)}$.

$$C(i) = \begin{cases} +1 & \text{with probability } \frac{1}{2}-\frac{Z(i)-Y(i)}{2(d'+1)} \\ -1 & \text{otherwise} \end{cases}$$

By hypothesis, this probability lies in [0,1]. Define a vector $\vec{I}$ such that $I(i)$ is the 0-1 indicator function for $C(i)=B(i)$. Note that $$Pr[I(i)] = \begin{cases} \frac{1}{2}-\frac{Z(i)-Y(i)}{2(d'+1)} & \text{if } B(i)=+1 \\ \frac{1}{2}+\frac{Z(i)-Y(i)}{2(d'+1)} & \text{if } B(i)=-1 \end{cases}$$

Thus, $$Pr[I(i)] = \frac{1}{2}-\frac{B(i)(Z)(i)-Y(i))}{2(d'+1)}$$

Note that the $I(i)$'s are mutually independent, as each $I(i)$ depends only on the random choice made for $C(i)$.

Define $$\alpha = \frac{c}{2(d'+1)},\ \text{and}\ \mu = E[\vec{I}\cdot\vec{1}] = \left(\frac{1}{2}+\alpha\right)L.$$

By applying Chernoff bounds, $$Pr\left[\sum_i I(i) \leq (1-\gamma)\mu\right] \leq e^{-\mu\gamma^2/2}$$

Choosing $\gamma=\alpha/4$, we see that $$(1-\gamma)\mu = \left(1-\frac{\alpha}{4}\right)\left(\frac{1}{2}+\alpha\right)L \geq \left(\frac{1}{2}+\frac{\alpha}{2}\right)L$$

since $0<\alpha\leq 1$, and that the probability of failure is at most $e^{-\Omega(L)}$.

If $$\gamma < \frac{1}{9(d'+1)}\ \text{and}\ p\geq e^{-o(L)},$$

then the probability of a false negative by the detector is at most $2p$.

The proof is by contradiction.

We assume that the provider has a strategy which evades the detector with probability at least $2p$. Then, taking $S=\{\delta_r\}$ over all users $r$ and $W$ as defined in the framework, we show that with probability greater than $p$, the provider has more than an $\gamma$ advantage in predicting $\Delta(u,v)$, taken over all $(u,v)\in W$, contradicting the Limited Knowledge Assumption. As before, $L=|W|$.

If the provider $r$ evades the detector, then his queries imply a vector $\vec{Z}$ such that $|Z(i)-X(i)|\leq d'$, by the Bounded Distortion Assumption, and $\vec{B}^r\cdot(\vec{Z}-\vec{Y})<-a_{\text{diff}}(1-t)L$, since evading the detector implies $\text{sim}(\vec{B}^r,\vec{Z})<tL$.

Given his graph $G'=G_{\delta_r}$, the provider can compute the vector $Y(i)=d_G(u_i,v_i)$. Since $|a_1|,|a_2|\leq 1$, $|Z(i)-Y(i)|\leq d'+1$. Then, he applies the process from Proposition 5. If it succeeds, it produces a $C$ with $$\sum_i [C(i)=B(i)] \geq \frac{L}{2}+\frac{a_{\text{diff}}(1-t)L}{4(d'+1)}$$

By our choice of $t=0.1$ and the fact that $a_{\text{diff}}\geq\frac{1}{2}$, $$\frac{a_{\text{diff}}(1-t)}{4(d'+1)} \geq \frac{1}{9(d'+1)} > \gamma$$

Since he evades the detector with probability at least $2p$, and the probability that the process generating $C$ fails is $e^{-\Omega(L)}$, the provider generates such a $C$ with probability at least $p$, if $p\geq e^{-o(L)}$.

Since $\Delta(u_i,v_i)=D(i)=a_{\text{mid}}+B(i)a_{\text{diff}}$, the provider's strategy $A_{G'}$ computes such a vector $C(i)$, and guesses that $\Delta(u_i,v_i)=a_{\text{mid}}+B(i)a_{\text{diff}}$. This strategy achieves $$Pr_{\delta\in S}\left[\sum_{(u,v)\in W}[A_{G_\delta}(u,v)=\Delta(u,v)] > \left(\frac{1}{2}+\gamma\right)|W|\right] < p$$

contradicting the $(\gamma,p)$-unpredictability of $S$ with respect to $W$.

We claim:

1. A method to watermark structured data comprising the steps of:

encoding original structured data by adding a predetermined acceptable and detectable level of distortion to form a watermarked copy of the structured data, distortion being added at each element of a selected subset of data elements, the selection of the subset being performed without reliance on inherent characteristics of the original structured data that tend to indicate the origin of the original structured data, the selection of the subset being performed so as to allow variability in the choice of data elements so as to allow creation of indicia that will both identify the watermarked copy as originating from a known source and distinguish the watermarked copy from other watermarked copies; and coding the added predetermined acceptable and detectable level of distortion to create indicia to make the watermarked copy uniquely recognizable and identify the watermarked copy as originating from a known source, the identification of the watermarked copy as originating from a known source being without reliance on inherent characteristics of the watermarked copy apart from the characteristics forming the watermarking.

2. The method of claim 1 wherein the structured data is map data defined by a plurality of nodes connected by edges, each edge having a defined length, and the step of encoding further comprises changing the lengths of a set of said edges.

3. The method of claim 1 wherein the predetermined acceptable and detectable level of distortion is additive distortion.

4. The method of claim 1 wherein the predetermined acceptable and detectable level of distortion is multiplicative distortion.

5. A system for watermarking structured data comprising:
means for encoding original structured data by adding a predetermined acceptable and detectable level of distortion to form a watermarked copy of the structured data, distortion being added at each element of a selected subset of data elements, the selection of the subset being performed without reliance on inherent characteristics of the original structured data that tend to indicate the origin of the original structured data, the selection of the subset being performed so as to allow variability in the choice of data elements so as to allow creation of indicia that will both identify the watermarked copy as originating from a known source and to distinguish the watermarked copy from other watermarked copies; and means for coding the added predetermined acceptable and detectable level of distortion to create indicia to make the watermarked copy uniquely recognizable and to identify the watermarked copy as originating from a known source, the identification of the watermarked copy as originating from a known source being without reliance on inherent characteristics of the watermarked copy apart from the characteristics forming the watermarking.

6. The system of claim 5 wherein the structured data is map data defined by a plurality of nodes connected by edges, each edge having a defined length, and the means for encoding further comprises means for changing the lengths of a set of said edges.

7. A method to transmit watermarked structured data and detect unauthorized copies comprising the steps of:
encoding original structured data by adding a predetermined acceptable and detectable level of distortion to form a watermarked copy of the structured data, distortion being added at each element of a selected subset of data elements, the selection of the subset being performed without reliance on inherent characteristics of the original structured data that tend to indicate the origin of the original structured data, the selection of the subset being performed so as to allow variability in the choice of data elements so as to allow creation of indicia that will both identify the watermarked copy as originating from a known source and to distinguish the watermarked copy from other watermarked copies;

coding the added predetermined acceptable and detectable level of distortion to create indicia to make the watermarked copy uniquely recognizable and to identify the watermarked copy as originating from a known source, the identification of the watermarked copy as originating from a known source being without reliance on inherent characteristics of the watermarked copy apart from the characteristics forming the watermarking;

transmitting the watermarked copy over a communication network; and decoding a suspect structured data to determine its legitimacy.

8. The method of claim 7 wherein the structured data is map data defined by a plurality of nodes connected by edges having a defined length and the step of encoding further comprises changing the lengths of a set of said edges.

9. The method of claim 8 wherein the step of decoding comprises examining the length of at least one of said edges.

10. The method of claim 8 wherein the step of decoding comprises examining distances separating pairs of nodes.

11. The method of claim 8 wherein the step of decoding comprises directly examining shortest paths between pairs of nodes.

12. The method of claim 8 wherein the step of decoding comprises indirectly examining shortest paths between pairs of nodes.

13. A system to watermark structured data comprising:
means for encoding original structured data by adding a predetermined acceptable and detectable level of distortion to form a watermarked copy of the structured data, distortion being added at each element of a selected subset of data elements, the selection of the subset being performed without reliance on inherent characteristics of the original structured data that tend to indicate the origin of the original structured data, the selection of the subset being performed so as to allow variability in the choice of data elements so as to allow creation of indicia that will both identify the watermarked cops as originating from a known source and to distinguish the watermarked copy from other watermarked copies; and means for coding the added predetermined acceptable and detectable level of distortion to create indicia to make the watermarked copy uniquely recognizable and to identify the watermarked copy as originating from a known source, the identification of the watermarked copy as originating from a known source being without reliance on inherent characteristics of the watermarked copy apart from the characteristics forming the watermarking;

means for transmitting the watermarked copy over a communication network; and means for decoding a suspect structured data to determine its legitimacy.

14. The system of claim 13 wherein the means for decoding comprises decoding a distorted suspect structured data.

15. The system of claim 13 wherein the structured data is map data defined by a plurality of nodes connected by edges having a defined length and the means for encoding further comprises means for changing the lengths of a set of said edges.

16. The system of claim 15 wherein the means for decoding further comprises means for examining the length of at least one of said edges.

17. The system of claim 15 wherein the means for decoding further comprises means for examining the distances separating pairs of nodes.

18. The system of claim 15 wherein the means for decoding further comprises means for directly examining the shortest paths between pairs of nodes.

19. The system of claim 15 wherein the means for decoding further comprises means for indirectly examining the shortest paths between pairs of nodes.

20. A method to watermark structured data comprising the steps of:

providing a graph comprising a plurality of nodes connected by edges, each of said edges having an associated edge length; and creating a first marked copy of the graph by modifying the edge length of at least one of said edges, selection and modification of the edge length being performed without reliance on inherent characteristics of the original structured data that tend to indicate the origin of the original structured data, selection and modification of the edge length being performed so as to allow variability in the choice of data elements so as to allow creation of indicia that will both identify the watermarked copy as originating from a known source and to distinguish the watermarked cop from other watermarked copies.

21. The method of claim 20 wherein the graph comprises structured map data.

22. The method of claim 20 further comprising the step of:

creating a second marked copy of the graph by modifying the edge length of at least one of said edges.

23. The method of claim 20 wherein the step of creating a first marked copy further comprises the step of:

encoding a number of bits with additive distortion $1/\epsilon$, where $\epsilon$ represents a small constant greater than 0, such that for $\epsilon>0$ the number of encoded bits is at least proportional to $n^{1/2-\epsilon}$, where n represents the number of nodes.

24. The method of claim 23 further comprising the step of:

decoding the first marked copy by querying the distances between pairs of nodes.

25. The method of claim 20 wherein the step of creating a first marked copy further comprises the step of:

encoding a number of bits with multiplicative distortion $1+\epsilon$, where $\epsilon$ represents a small constant greater than 0, such that for $\epsilon>0$ the number of encoded bits is at least proportional to $n^{1-\epsilon}$, where n represents the number of nodes.

26. The method of claim 25 further comprising the step of:

decoding the first marked copy by querying the distances between pairs of nodes.

27. The method of claim 20 wherein the step of creating a first marked copy further comprises the step of:

encoding a number of bits with multiplicative distortion which is bounded by a constant without reliance on n and m, such that for $\epsilon>0$, where $\epsilon$ represents a small constant greater than 0, the number of encoded bits is at least proportional to $m^{1/2}$, where m represents the number of edges and n represents the number of nodes.

28. The method of claim 27 further comprising the step of:

decoding the first marked copy by querying the shortest paths between pairs of nodes.

29. A method to watermark structured data comprising the steps of:

providing a graph comprising a plurality of nodes connected by edges, each of said edges having an associated edge length; and creating a first marked copy of the graph by modifying the edge length of at least one of said edges, the step of creating a first marked copy further comprising encoding a number of bits with additive distortion $1/\epsilon$, where $\epsilon$ represents a small constant greater than 0, such that for $\epsilon>0$ the number of encoded bits is at least proportional to $n^{1/2-\epsilon}$, where n represents the number of nodes.

30. The method of claim 29 further comprising the step of:

decoding the first marked copy by querying the distances between pairs of nodes.

31. A method to watermark structured data comprising the steps of:

providing a graph comprising a plurality of nodes connected by edges, each of said edges having an associated edge length; and creating a first marked copy of the graph by modifying the edge length of at least one of said edges, the step of creating the first marked copy comprising encoding a number of bits with multiplicative distortion $1+\epsilon$, where $\epsilon$ represents a small constant greater than 0, such that for $\epsilon>0$ the number of encoded bits is at least proportional to $n^{1-\epsilon}$, where n represents the number of nodes.

32. The method of claim 31 further comprising the step of:

decoding the first marked copy by querying the distances between pairs of nodes.

33. A method to watermark structured data comprising the steps of:

providing a graph comprising a plurality of nodes connected by edges, each of said edges having an associated edge length; and creating a first marked copy of the graph by modifying the edge length of at least one of said edges, the step of creating the first marked copy comprising encoding a number of bits with multiplicative distortion which is bounded by a constant without reliance on n and m, such that for $\epsilon>0$, where $\epsilon$ represents a small constant greater than 0, the number of encoded bits is at least proportional to $m^{1/2}$, where m represents the number of edges and n represents the number of nodes.

34. The method of claim 33 further comprising the step of:

coding the first marked copy by querying the shortest paths between pairs of nodes.

* * * * *